(12) United States Patent
Lee et al.

(10) Patent No.: US 12,335,898 B2
(45) Date of Patent: Jun. 17, 2025

(54) METHOD FOR TRANSMITTING AND RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Jeongsu Lee, Seoul (KR); Hyunsu Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 385 days.

(21) Appl. No.: 17/759,774

(22) PCT Filed: Feb. 15, 2021

(86) PCT No.: PCT/KR2021/001889
§ 371 (c)(1),
(2) Date: Jul. 29, 2022

(87) PCT Pub. No.: WO2021/162515
PCT Pub. Date: Aug. 19, 2021

(65) Prior Publication Data
US 2023/0164732 A1    May 25, 2023

(30) Foreign Application Priority Data

Feb. 14, 2020   (KR) .................. 10-2020-0018618
Feb. 14, 2020   (KR) .................. 10-2020-0018623

(51) Int. Cl.
*H04W 64/00*     (2009.01)

(52) U.S. Cl.
CPC .................. *H04W 64/00* (2013.01)

(58) Field of Classification Search
CPC ............ H04W 56/005; H04W 56/00; H04W 72/1268; H04W 74/0833; H04W 74/0841;
(Continued)

(56) References Cited

U.S. PATENT DOCUMENTS

2018/0279274 A1 * 9/2018 Sun ................. H04W 52/367
2019/0174466 A1 * 6/2019 Zhang ............... H04L 5/0057
(Continued)

FOREIGN PATENT DOCUMENTS

EP          3823220 A1 *  5/2021  ......... H04B 7/15507
WO       2018-175760         9/2018

OTHER PUBLICATIONS

PCT International Application No. PCT/KR2021/001889, International Search Report dated Jun. 9, 2021, 3 pages.
(Continued)

*Primary Examiner* — Nathan S Taylor
(74) *Attorney, Agent, or Firm* — LEE, HONG, DEGERMAN, KANG & WAIMEY

(57) ABSTRACT

Various embodiments relate to a next generation wireless communication system for supporting a data transmission rate and the like higher than that of beyond 4th generation (4G) wireless communication systems. According to various embodiments, a method for transmitting and receiving a signal in a wireless communication system, and an apparatus for supporting same may be provided, and other various embodiments may also be provided.

11 Claims, 25 Drawing Sheets

(58) Field of Classification Search
CPC . H04W 74/0866; H04W 74/08; H04W 72/12; H04W 4/06; H04W 76/40; H04W 64/00; H04W 52/0229; H04W 52/0235; H04W 68/025; H04W 76/28; H04W 24/10; H04W 52/0206; H04W 52/0216; H04W 52/0232; H04W 64/006; H04W 8/24; H04W 52/02; G01S 13/003; G01S 13/765; G01S 13/767; G01S 13/87; G01S 13/00; G01S 13/76; G01S 5/02; H04L 43/0864; H04L 1/0003; H04L 1/0009; H04L 1/0026; H04L 1/1816; H04L 1/1822; H04L 1/1861; H04L 12/1868; H04L 2001/0093; H04L 5/0055; H04L 1/18; H04L 5/00; H04L 5/0048; H04L 5/0053

See application file for complete search history.

(56) References Cited

U.S. PATENT DOCUMENTS

| | | | | |
|---|---|---|---|---|
| 2019/0281587 | A1* | 9/2019 | Zhang | H04W 72/23 |
| 2019/0363843 | A1* | 11/2019 | Gordaychik | H04W 72/044 |
| 2020/0029302 | A1* | 1/2020 | Cox | H04W 52/0216 |
| 2021/0037592 | A1* | 2/2021 | Lee | H04W 74/0833 |
| 2022/0046744 | A1* | 2/2022 | Bao | H04W 72/23 |
| 2022/0053424 | A1* | 2/2022 | Bao | H04W 52/028 |
| 2022/0110085 | A1* | 4/2022 | Khoryaev | H04W 64/003 |
| 2023/0389125 | A1* | 11/2023 | Islam | H04W 52/0229 |
| 2023/0397112 | A1* | 12/2023 | Sun | H04W 84/04 |

OTHER PUBLICATIONS

Qualcomm Incorporated, "Assistance Data for DL-only UE-based mode," R2-1915563, 3GPP TSG-RAN WG2 Meeting #108, Nov. 2019, 16 pages.

Intel Corporation, "Assistance data for UE based positioning," R2-1914730, 3GPP TSG RAN WG2 Meeting #108, Nov. 2019, 5 pages.

Huawei et al., "PDCCH-based power saving signal/channel," R1-1906005, 3GPP TSG RAN WG1 Meeting #97, May 2019, 12 pages.

* cited by examiner

FIG. 5
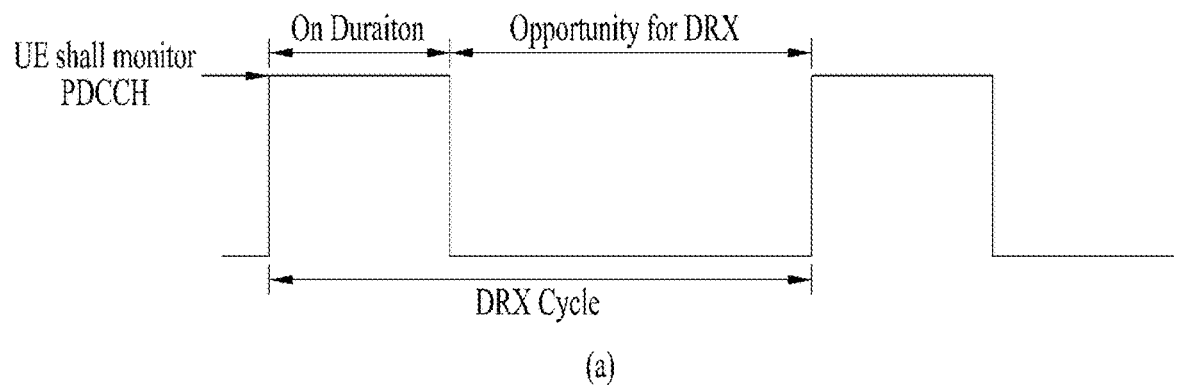
(a)
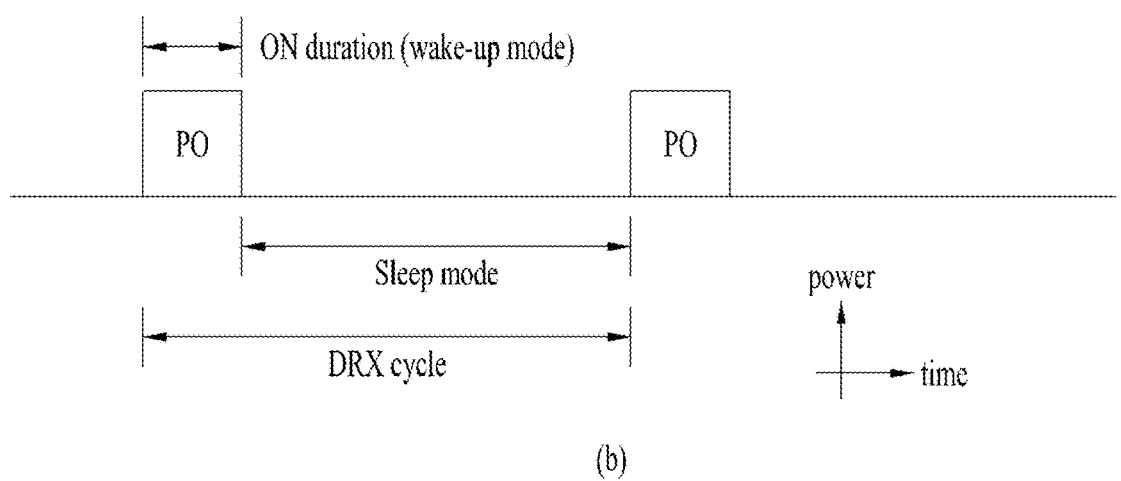
(b)

FIG. 12
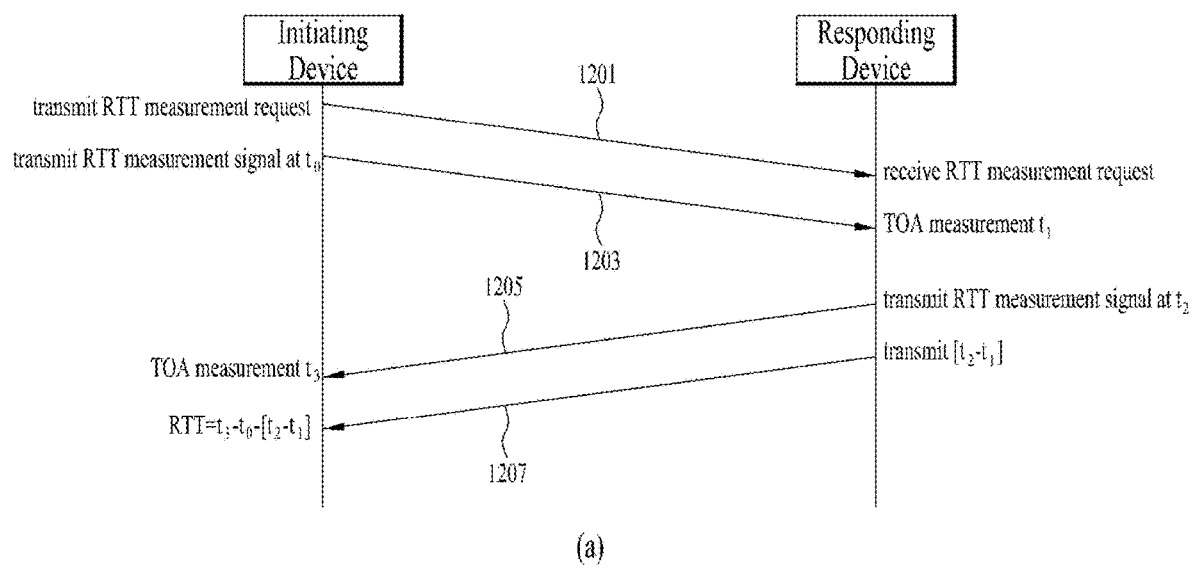
(a)
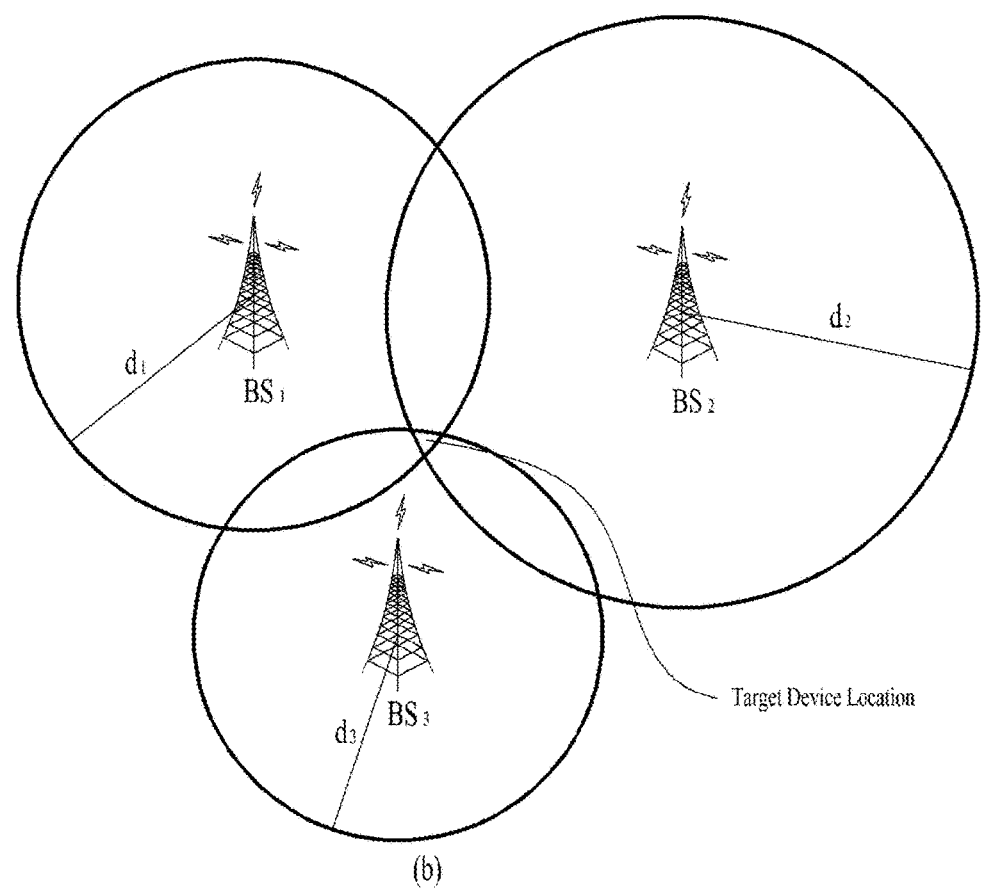
(b)

METHOD FOR TRANSMITTING AND RECEIVING SIGNAL IN WIRELESS COMMUNICATION SYSTEM, AND APPARATUS FOR SUPPORTING SAME

CROSS-REFERENCE TO RELATED APPLICATION(S)

This application is the National Stage filing under 35 U.S.C. 371 of International Application No. PCT/KR2021/001889, filed on Feb. 15, 2021, which claims the benefit of earlier filing date and right of priority to Korean Application Nos. 10-2020-0018618, filed on Feb. 14, 2020, and 10-2020-0018623, filed on Feb. 14, 2020, the contents of which are all hereby incorporated by reference herein in their entireties.

Technical Field

Various embodiments are related to a wireless communication system.

Background Art

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a method for triggering a positioning measurement operation for a terminal in a wireless communication system and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method for transmitting and receiving a signal in a wireless communication system and an apparatus supporting the same.

According to various embodiments, a method carried out by an apparatus in a wireless communication system may be provided.

According to various embodiments, the method may include receiving a system information block (SIB) including assistance data related to positioning, and receiving downlink control information (DCI) including information related to a wake-up indication.

According to various embodiments, the DCI further may include first information indicating whether the apparatus is configured to acquire a measurement related to the positioning, According to various embodiments, based on the first information indicating that the apparatus is configured to acquire the measurement, the measurement may be acquired using a positioning reference signal (PRS) related to the assistance data.

According to various embodiments, the first information may include a first bit field of a 1-bit-size, According to various embodiments, the first bit field having a first value may be mapped to the apparatus being configured to acquire the measurement.

According to various embodiments, the first bit field having a second value is mapped to the apparatus not being configured to acquire the measurement.

According to various embodiments, based on the first information indicating that the apparatus is configured to acquire the measurement, the DCI may further include second information indicating whether the apparatus is configured to report the measurement.

According to various embodiments, based on the second information indicating that the apparatus is configured to report the measurement, the measurement may be reported at a resource for reporting of the measurement.

According to various embodiments, based on the second information indicating that the apparatus is configured to report the measurement, one or more of an SIB including allocation information about the resource for reporting of the measurement, a paging message, or a message including information related to a random access response (RAR) may be received.

The method of claim 3, wherein the second information may include a second bit field of a 1-bit-size, According to various embodiments, the second bit field having a first value may be mapped to the apparatus being configured to report the measurement.

According to various embodiments, the second bit field having a second value may be mapped to the apparatus not being configured to report the measurement.

According to various embodiments, the PRS may be received after a time for reception of the DCI.

According to various embodiments, the DCI may further include information indicating, in a bitmap, a positioning method used for the apparatus to acquire the measurement using the PRS.

According to various embodiments, a terminal operating in a wireless communication system may be provided.

According to various embodiments, the terminal may include one or more transceivers, one or more memories, and one or more processors connected to the one or more transceivers and the one or more memories.

According to various embodiments, the one or more processors are configured to receive a system information block (SIB) including assistance data related to positioning, and receive downlink control information (DCI) including information related to a wake-up indication.

According to various embodiments, the DCI may further include first information indicating whether the terminal is configured to acquire a measurement related to the positioning, According to various embodiments, based on the first information indicating that the terminal is configured to acquire the measurement, the measurement may be acquired using a positioning reference signal (PRS) related to the assistance data.

According to various embodiments, the first information may include a first bit field of a 1-bit-size.

According to various embodiments, the first bit field having a first value may be mapped to the apparatus being configured to acquire the measurement.

According to various embodiments, the first bit field having a second value may be mapped to the terminal not being configured to acquire the measurement.

According to various embodiments, based on the first information indicating that the terminal is configured to acquire the measurement, the DCI may further include second information indicating whether the terminal is configured to report the measurement.

According to various embodiments, based on the second information indicating that the terminal is configured to report the measurement, the measurement may be reported at a resource for reporting of the measurement.

According to various embodiments, the terminal may be configured to communicate with one or more of a mobile terminal, a network, and an autonomous vehicle other than a vehicle containing the terminal.

According to various embodiments, a method carried out by an apparatus in a wireless communication system may be provided.

According to various embodiments, the method may include transmitting a system information block (SIB) including assistance data related to positioning, and transmitting downlink control information (DCI) including information related to a wake-up indication.

According to various embodiments, the DCI transmitted to a terminal may further include second information indicating whether the terminal is configured to acquire a measurement related to the positioning, According to various embodiments, in response to the first information indicating that the terminal is configured to acquire the measurement, a positioning reference signal (PRS) related to the assistance data may be transmitted.

According to various embodiments, a base station operating in a wireless communication system may be provided.

According to various embodiments, the base station may include one or more transceivers, one or more memories, and one or more processors connected to the one or more transceivers and the one or more memories.

According to various embodiments, the one or more processors are configured to transmit a system information block (SIB) including assistance data related to positioning, and transmit downlink control information (DCI) including information related to a wake-up indication.

According to various embodiments, the DCI transmitted to a terminal may further include first information indicating whether the terminal is configured to acquire a measurement related to the positioning.

According to various embodiments, in response to the first information indicating that the terminal is configured to acquire the measurement, a positioning reference signal (PRS) related to the assistance data may be transmitted.

According to various embodiments, an apparatus operating in a wireless communication system may be provided.

According to various embodiments, the apparatus may include one or more processors, and one or more memories storing one or more instructions to cause the one or more processors to carry out a method.

According to various embodiments, the method may include receiving a system information block (SIB) including assistance data related to positioning, and receiving downlink control information (DCI) including information related to a wake-up indication.

According to various embodiments, the DCI may further include first information indicating whether the apparatus is configured to acquire a measurement related to the positioning, According to various embodiments, based on the first information indicating that the apparatus is configured to acquire the measurement, the measurement may be acquired using a positioning reference signal (PRS) related to the assistance data.

According to various embodiments, a processor-readable medium storing one or more instructions to cause one or more processors to carry out a method may be provided.

According to various embodiments, the method may include receiving a system information block (SIB) including assistance data related to positioning, and receiving downlink control information (DCI) including information related to a wake-up indication.

According to various embodiments, the DCI may further include first information indicating whether the apparatus is configured to acquire a measurement related to the positioning, According to various embodiments, based on the first information indicating that the apparatus is configured to acquire the measurement, the measurement may be acquired using a positioning reference signal (PRS) related to the assistance data.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments, a signal may be effectively transmitted and received in a wireless communication system.

According to various embodiments, positioning may be effectively performed in a wireless communication system.

According to various embodiments, a triggering method for a positioning measurement operation for an RRC-connected terminal as well as an RRC idle/inactive terminal may be provided.

According to various embodiments, a positioning measurement operation for an RRC connected terminal as well as an RRC idle/inactive terminal may be provided without ambiguity.

According to various embodiments, power consumption of the terminal may be reduced.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 5 is a diagram illustrating an exemplary discontinuous reception (DRX) operation according to various embodiments.

FIG. 12 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1.3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
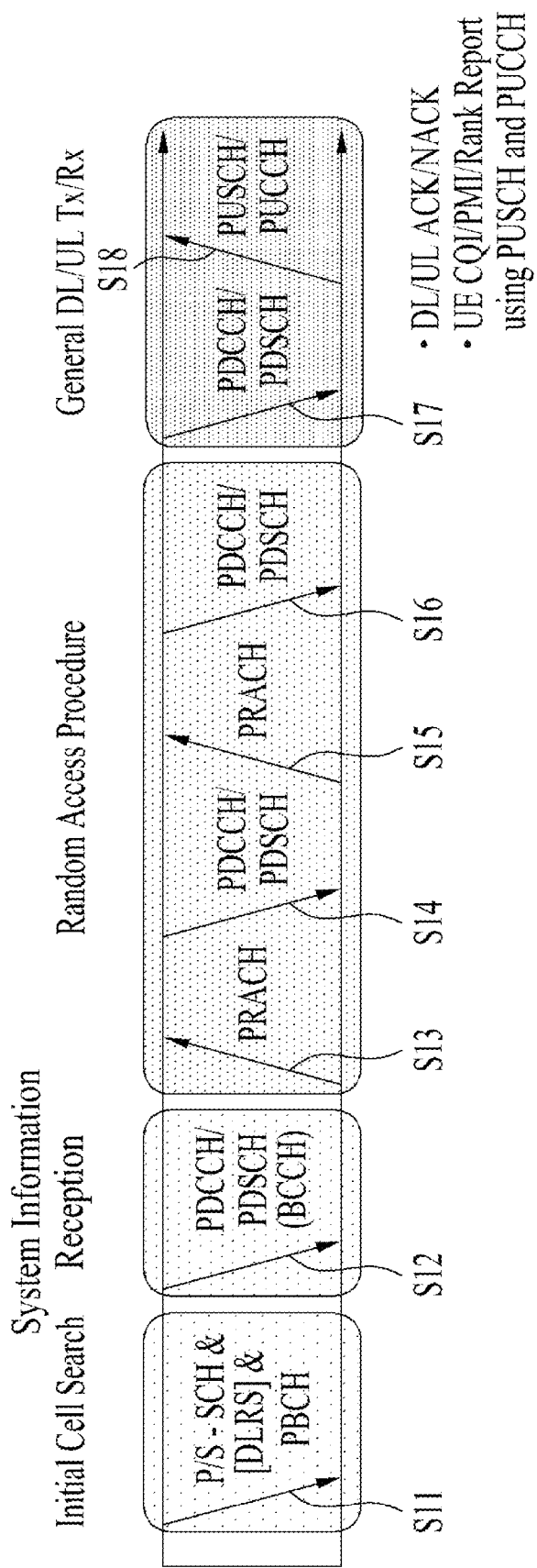
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resources

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 2:
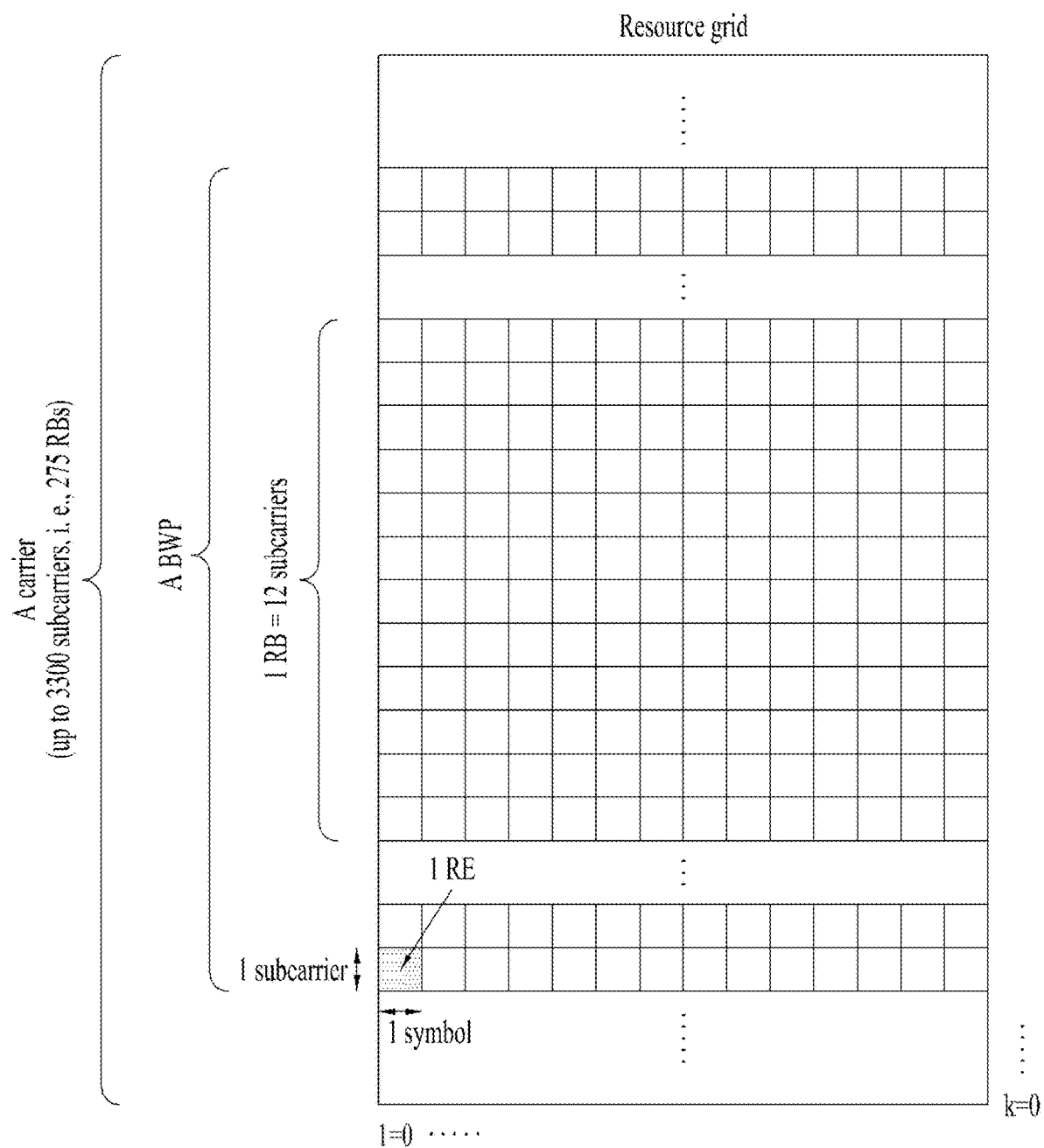
FIG. 2 is a diagram illustrating a resource grid in a new radio (NR) system to which various embodiments are applicable.

FIG. 2 illustrates an exemplary resource grid to which various embodiments are applicable.

Referring to FIG. 2, for each subcarrier spacing (SCS) and carrier, a resource grid is defined as $14 \times 2^\mu$ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration $\mu$ and a transmission direction, UL or DL. There is one resource grid for an SCS configuration $\mu$, an antenna port p, and a transmission direction (UL or DL). Each element of the resource grid for the SCS configuration $\mu$ and the antenna port p is referred to as an RE and uniquely identified by an index pair (k, l) where k represents an index in the frequency domain, and l represents a symbol position in the frequency domain relative to a reference point. The RE (k, l) for the SCS configuration $\mu$ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 3:
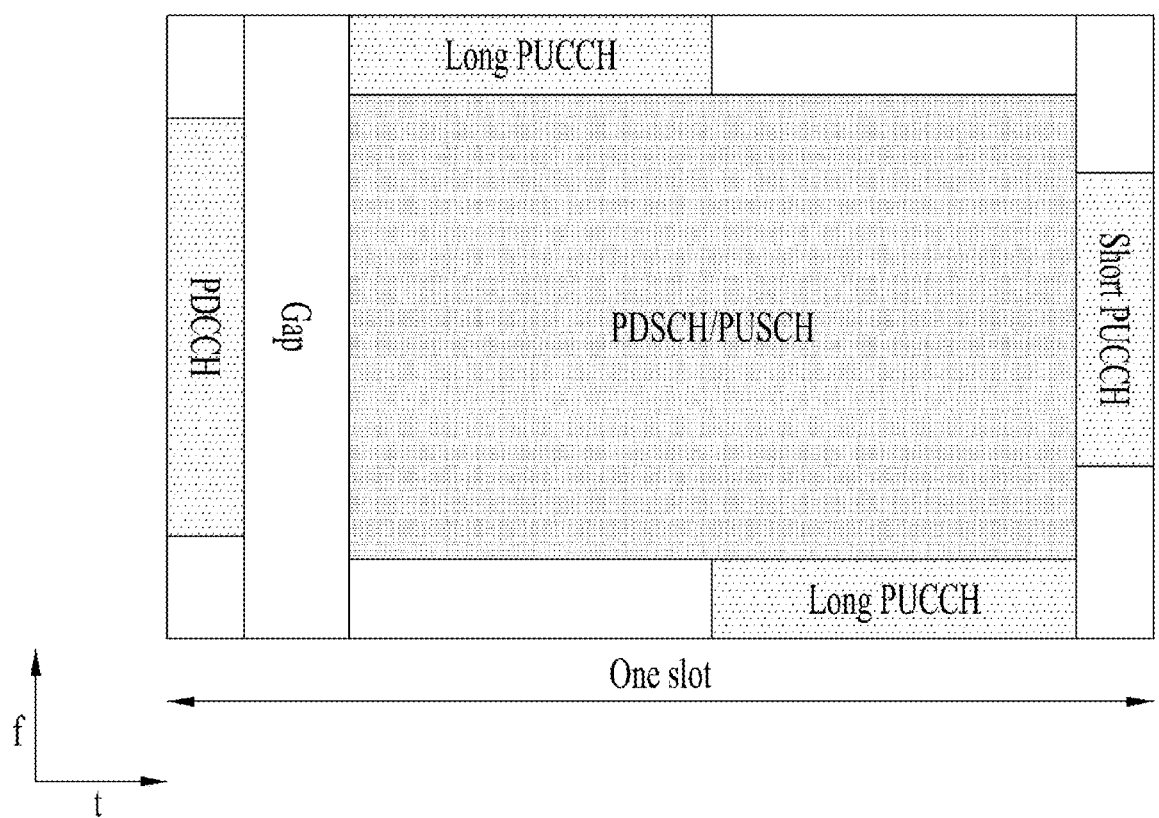
FIG. 3 is a diagram illustrating mapping of physical channels in a slot, to which various embodiments are applicable.

FIG. 3 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/

NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. Radio Resource Control (RRC) States

Figure 4:
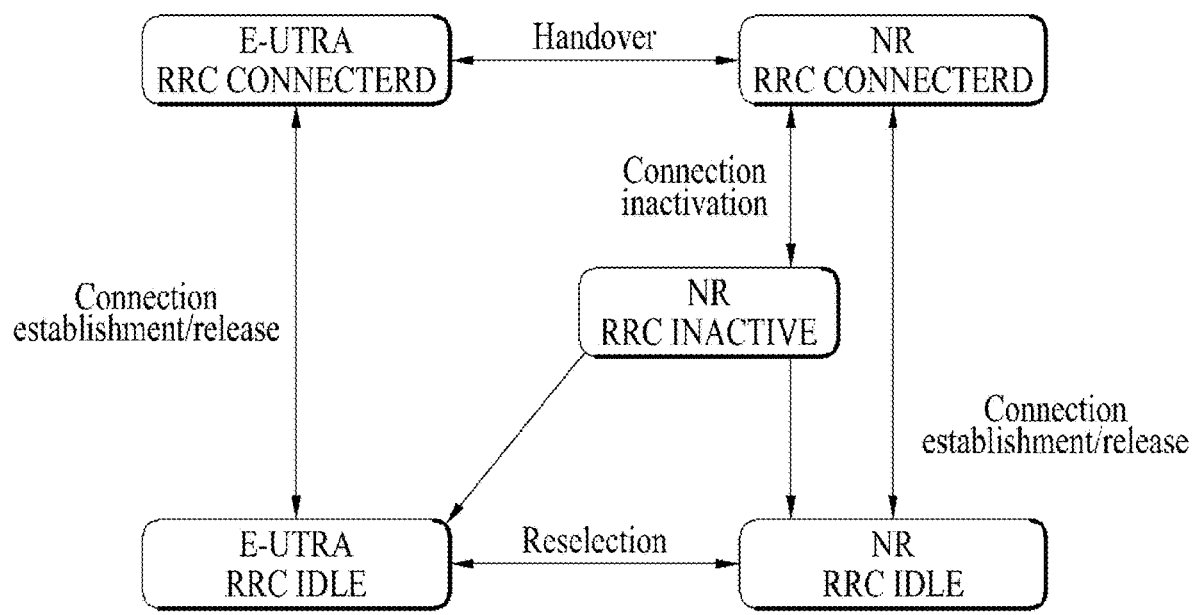
FIG. 4 is a diagram illustrating radio resource control (RRC) states, RRC state transition, and a mobility procedure supported between an NR/next generation core (NGC) and an evolved-universal terrestrial radio access network/evolved packet core (E-UTRAN/EPC), to which various embodiments are applicable.

FIG. 4 is a diagram illustrating RRC states, RRC state transition, and a mobility procedure supported between an NR/next generation core (NGC) and an evolved-universal terrestrial radio access network/evolved packet core (E-UTRAN/EPC), to which various embodiments are applicable.

The UE has only one RRC state at a specific time. The RRC state indicates whether the RRC layer of the UE is logically connected to the layer of the NG radio access network (RAN). When an RRC connection has been established, the UE may be in an RRC_CONNECTED state or an RRC_INACTIVE state. When the RRC connection has not been established, the UE is in an RRC_IDLE state.

In the RRC_CONNECTED state or the RRC_INACTIVE state, the UE has an RRC connection, and accordingly, the NG RAN may recognize the existence of the UE on a cell basis. On the other hand, in the RRC_IDLE state, the UE may not be recognized by the NG RAN and is managed by a core network on a tracking area basis. A tracking area is a unit wider than a cell.

When a user initially turns on the UE, the UE searches for an appropriate cell and maintains the RRC_IDLE state in the cell. Only when the RRC_IDLE-state UE needs to establish an RRC connection, the RRC_IDLE-state UE establishes the RRC connection with the NG RAN in an RRC connection procedure, and transitions to the RRC_CONNECTED state or the RRC_INACTIVE state.

The RRC states of the UE have the following features.

(1) RRC_IDLE State

The UE may be configured with discontinuous reception (DRX) by a higher layer.

The mobility of the UE is controlled based on a network configuration.

The UE monitors a paging channel.

The UE performs neighbor cell measurement and cell (re) selection.

The UE acquires system information.

(2) RRC_INACTIVE State

The UE may be configured with DRX by the higher layer or RRC layer.

The mobility of the UE is controlled based on a network configuration.

The UE stores an access stratum (AS) context.

The UE monitors a paging channel.

The UE performs neighbor cell measurement and cell (re) selection.

When the UE moves outside a RAN-based notification area, the UE performs RAN-based notification area update.

The UE acquires system information.

(3) RRC_CONNECTED State

The UE stores an AS context.

The UE transmits and receives unicast data.

At a lower layer, the UE may be configured with UE-specific DRX.

A UE supporting carrier aggregation (CA) may use one or more secondary cells (SCells) aggregated with a special cell (SpCell), for an increased bandwidth.

A UE supporting dual connectivity (DC) may use a secondary cell group (SCG) aggregated with a master cell group (MCG), for an increased bandwidth.

The UE monitors a paging channel.

When data is scheduled for the UE, the UE monitors a control channel associated with a shared data channel.

The UE provides channel quality and feedback information.

The UE performs neighbor cell measurement and cell (re) selection.

The UE acquires system information.

Particularly, the RRC_IDLE or RRC_INACTIVE UE may operate as described in Table 1 below.

TABLE 1

| | UE procedure |
| --- | --- |
| $1^{st}$ step | a public land mobile network (PLMN) selection when a UE is switched on |
| $2^{nd}$ Step | cell (re)selection for searching a suitable cell |
| $3^{rd}$ Step | tune to its control channel (camping on the cell) |
| $4^{th}$ Step | Location registration and a RAN-based Notification Area (RNA) update |

1.4. DRX (Discontinuous Reception)

FIG. 5 is an exemplary DRX operation according to various embodiments.

According to various embodiments, the UE may perform a DRX operation in the afore-described/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

RRC_CONNECTED DRX

In in the RRC_CONNECTED state, DRX is used to receive a PDCCH discontinuously. DRX in the RRC_CONNECTED state is referred to as RRC_CONNECTED DRX).

Referring to FIG. 5(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep mode after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 2 describes a DRX operation of a UE (in the RRC_CONNECTED state). Referring to Table 2, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments.

TABLE 2

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected.
- Value of drx-HARQ-RTT-TimerDL: defines the duration of a maximum time period until a DL retransmission is received after reception of a DL initial transmission.
- Value of drx-HARQ-RTT-TimerDL: defines the duration of a maximum time period until a grant for a UL retransmission is received after reception of a grant for a UL initial transmission.
- drx-LongCycleStartOffset: defines the duration and starting time of a DRX cycle.
- drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 5(b), DRX may be configured for discontinuous reception of a paging signal. The UE may receive DRX configuration information from the BS by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

1.5. Wake-up Signal (WUS)

In a wireless communication system to which various embodiments are applicable, a WUS may be used to reduce power consumption related to paging monitoring. The WUS is a physical layer signal indicating whether a UE should monitor a paging signal (e.g., PDCCH (MTC PDCCH (MPDCCH)/narrowband PDCCH (NPDCCH) scrambled with a paging radio network temperature identifier (P-RNTI) according to a cell configuration. For a UE for which extended DRX (cDRX) is not configured (i.e., only DRX is configured), the WUS may be associated with one paging occasion (PO) (N=1). On the other hand, for a UE for which eDRX is configured, the WUS may be associated with one or more POs PO (N≥1). When the WUS is detected, the UE may monitor N POs after being associated with the WUS. On the other hand, when the WUS is not detected, the UE may maintain the sleep mode by omitting PO monitoring until the next WUS is monitored. For example, the WUS is applicable to, but not limited to, a machine type communication (MTC) system and/or a narrowband Internet of Things (NB-IoT) system. It may also be applicable to other general wireless communication systems.

Figure 6:
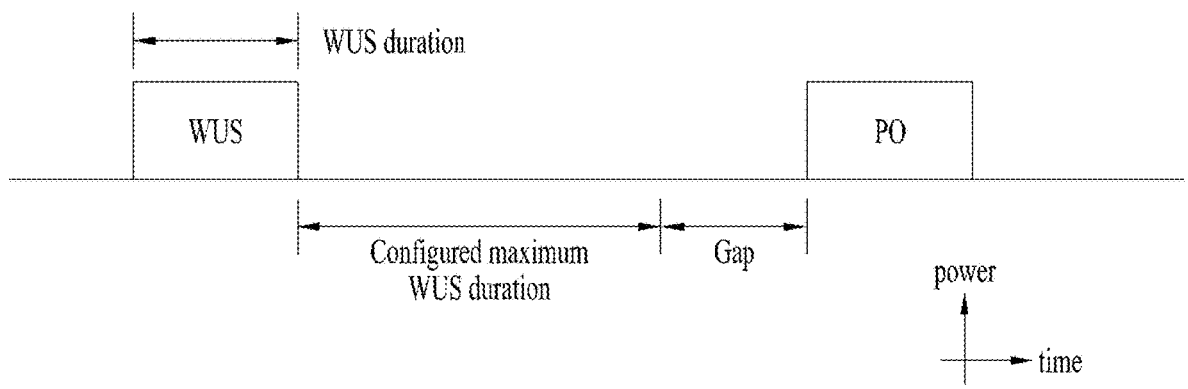
FIG. 6 is a diagram illustrating an example of a timing relationship between a WUS and a PO to which various embodiments are applicable.

FIG. 6 is a diagram illustrating an example of a timing relationship between a WUS and a PO to which various embodiments are applicable.

The UE may receive configuration information for the WUS from the BS and monitor the WUS based on the WUS configuration information. The configuration information for the WUS may include, for example, a maximum WUS duration, the number of consecutive POs associated with the WUS, and gap information. The maximum WUS duration represents a maximum time interval in which the WUS may be transmitted, and may be represented as a proportion with respect to the maximum number of repetitions (e.g., Rmax) related to PDCCH (e.g., MPDCCH, NPDCCH). The UE may expect repetitive WUS transmission within the maximum WUS duration, but the actual number of WUS transmissions may be less than the maximum number of WUS transmissions within the maximum WUS duration. For example, for a UE within good coverage, the number of WUS repetitions may be small. For simplicity, a resource/occasion on which a WUS may be transmitted within the maximum WUS duration is referred to as a WUS resource. The WUS resource may be defined as a plurality of consecutive frequency division multiplexing (OFDM) symbols and a plurality of consecutive subcarriers. The WUS resource may be defined as a plurality of consecutive OFDM symbols in a subframe or slot and a plurality of consecutive subcarriers. For example, the WUS resource may be defined as 14 consecutive OFDM symbols and 12 consecutive subcarriers. Upon detecting the WUS, the UE skips monitoring the WUS until the first PO associated with the WUS. When the WUS is not detected for the maximum WUS duration, the UE skips monitoring the paging signal in the POs associated with the WUS (or remains in the sleep mode).

Figure 7:
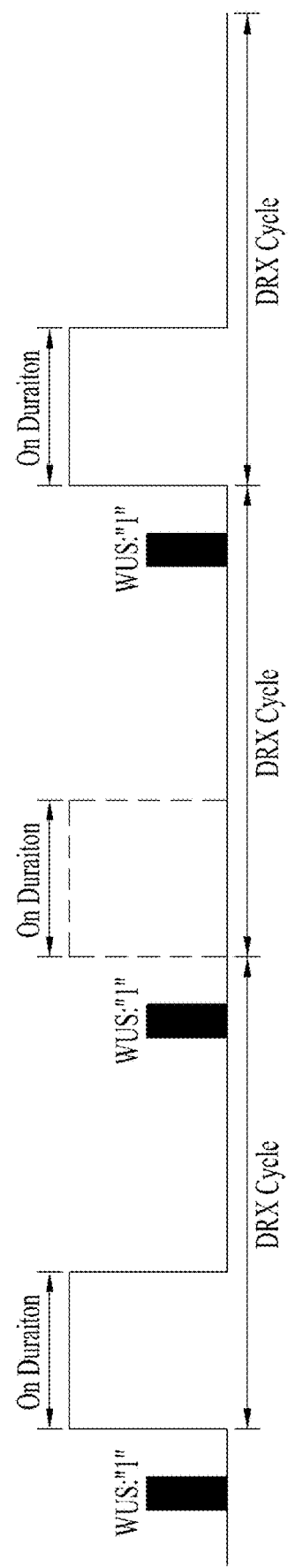
FIG. 7 is a diagram illustrating an example of WUS DCI to which various embodiments are applicable.

FIG. 7 is a diagram illustrating an example of WUS DCI to which various embodiments are applicable.

The DRX mechanism allows the UE to turn off a radio frequency (RF) circuit or the like for the DRX off duration, thereby reducing power consumption. However, in the case of sporadic traffic, for example, the periodic wake-up of the UE for PDCCH monitoring during DRX OnDuration may still cause power consumption.

In consideration of this issue, DCI signaling carrying a wake-up signal indication may be introduced. For example, DCI format 2_6 may be introduced. DCI signaling may include a cyclic redundancy check (CRC) scrambled with a dedicated indicator (e.g., a power saving radio network temporary identifier) for power saving. The DCI signaling may inform the UE whether to start the DRX OnDuration timer during the next DRX cycle for potential data scheduling. The UE may detect WUS DCI before DRX OnDuration. If the wake-up indication is set to 1, the UE may start the DRX OnDuration timer. Otherwise, the UE may not need to start the DRX OnDuration timer.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol configuration

Figure 8:
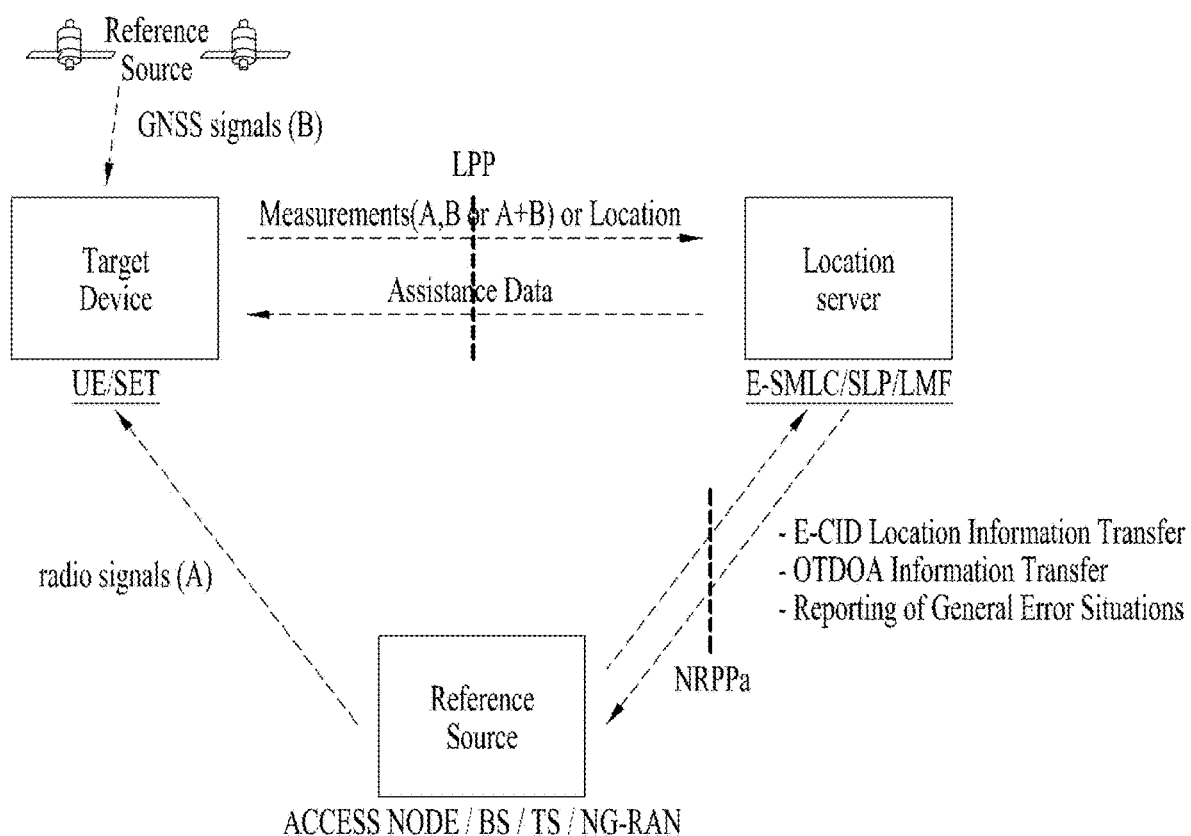
FIG. 8 is a diagram illustrating a positioning protocol configuration for positioning a user equipment (UE), to which various embodiments are applicable.

FIG. 8 is a diagram illustrating an exemplary positioning protocol configuration for positioning a UE, to which various embodiments are applicable.

Referring to FIG. 8, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0,1, . . . ) may be defined by Equation 1.

$$r(m) = \frac{1}{\sqrt{2}}(1 - 2c(m)) + j\frac{1}{\sqrt{2}}(1 - 2c(m+1)) \qquad \text{[Equation 1]}$$

In Equation 1, c (i) may be a pseudo-random sequence. A pseudo-random sequence generator may be initialized by Equation 2.

$$c_{init} = \left\{ 2^{22} \left\lfloor \frac{n_{ID,seq}^{PRS}}{1024} \right\rfloor + 2^{10} \left( N_{symb}^{slot} n_{s,f}^{\mu} + l + 1 \right) \right.$$

$$\left. \left( 2 \left( n_{ID,seq}^{PRS} \bmod 1024 \right) + 1 \right) + \left( n_{ID,seq}^{PRS} \bmod 1024 \right) \right\} \bmod 2^{31} \quad \text{[Equation 2]}$$

In Equation 2, $n_{s,f}^{\mu}$ may be a slot number in a frame in an SCS configuration μ. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in DL a PRS Resource

A PRS sequence r(m) may be scaled by $\beta_{PRS}$ and mapped to $(k,l)_{p,\mu}$, specifically by Equation 3. $(k,l)_{p,\mu}$ may represent an RE (k,l) for an antenna port p and the SCS configuration μ.

$$\alpha_{k,l}^{(p,\mu)} = \beta_{PRS} r(m)$$

$$m = 0, 1, \ldots$$

$$k = m K_{comb}^{PRS} + ((k_{offset}^{PRS} + k') \bmod K_{comb}^{PRS})$$

$$l = l_{start}^{PRS}, l_{start}^{PRS} + 1, \ldots, l_{start}^{PRS} + L_{PRS} - 1 \quad \text{[Equation 3]}$$

Herein, the following conditions may have to be satisfied:
The REs $(k,l)_{p,\mu}$ are included in an RB occupied by a DL PRS resource configured for the UE;
The symbol l not used by any SS/PBCH block used by a serving cell for a DL PRS transmitted from the serving cell or indicated by a higher-layer parameter SSB-positionInBurst for a DL PRS transmitted from a non-serving cell;
A slot number satisfies the following PRS resource set-related condition;
$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of {2, 2} {4, 2}, {6, 2}, {12, 2}, {4, 4}, {12, 4}, {6, 6}, {12, 6} and/or {12, 12}. An RE offset $K_{offset}^{PRS} \in \{0, 1, \ldots, K_{comb}^{PRS} - 1\}$ may be given by combOffset. A frequency offset k' may be a function of $l - l_{start}^{PRS}$ as shown in Table 6.

TABLE 6

| | Symbol number within the downlink PRS resource $l - l_{start}^{PRS}$ | | | | | | | | | | |
|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left( N_{slot}^{frame,\mu} n_f + n_{s,f}^{\mu} - T_{offset}^{PRS} - T_{offset,res}^{PRS} \right) \bmod$$
$$2^{\mu} T_{per}^{PRS} \in \{i T_{gap}^{PRS}\}_{i=0}^{T_{rep}^{PBS}-1} \quad \text{[Equation 3]}$$

$N_{slot}^{frame,\mu}$ may be the number of slots per frame in the SCS configuration μ. $n_f$ may be a system frame number (SFN). $n_{s,f}^{\mu}$ may be a slot number in a frame in the SCS configuration μ. A slot offset $T_{offset}^{PRS} \in \{0, 1, \ldots, T_{per}^{PRS} - 1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5,8,10,16,20,32,40,64,80,160, 320,640,1280,2560,5120,10240\}$ per may be given by a higher-layer parameter DL-PRS-Periodicity. A repetition factor $T_{rep}^{PBS} \in \{1,2,4,6,8,16,32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8, 16,32\}$ may be given by a higher-layer parameter DL-PRS-ResourceTimeGap.

2.3. Protocol for Positioning Measurement

LTE Positioning Protocol (LPP)

Figure 9:
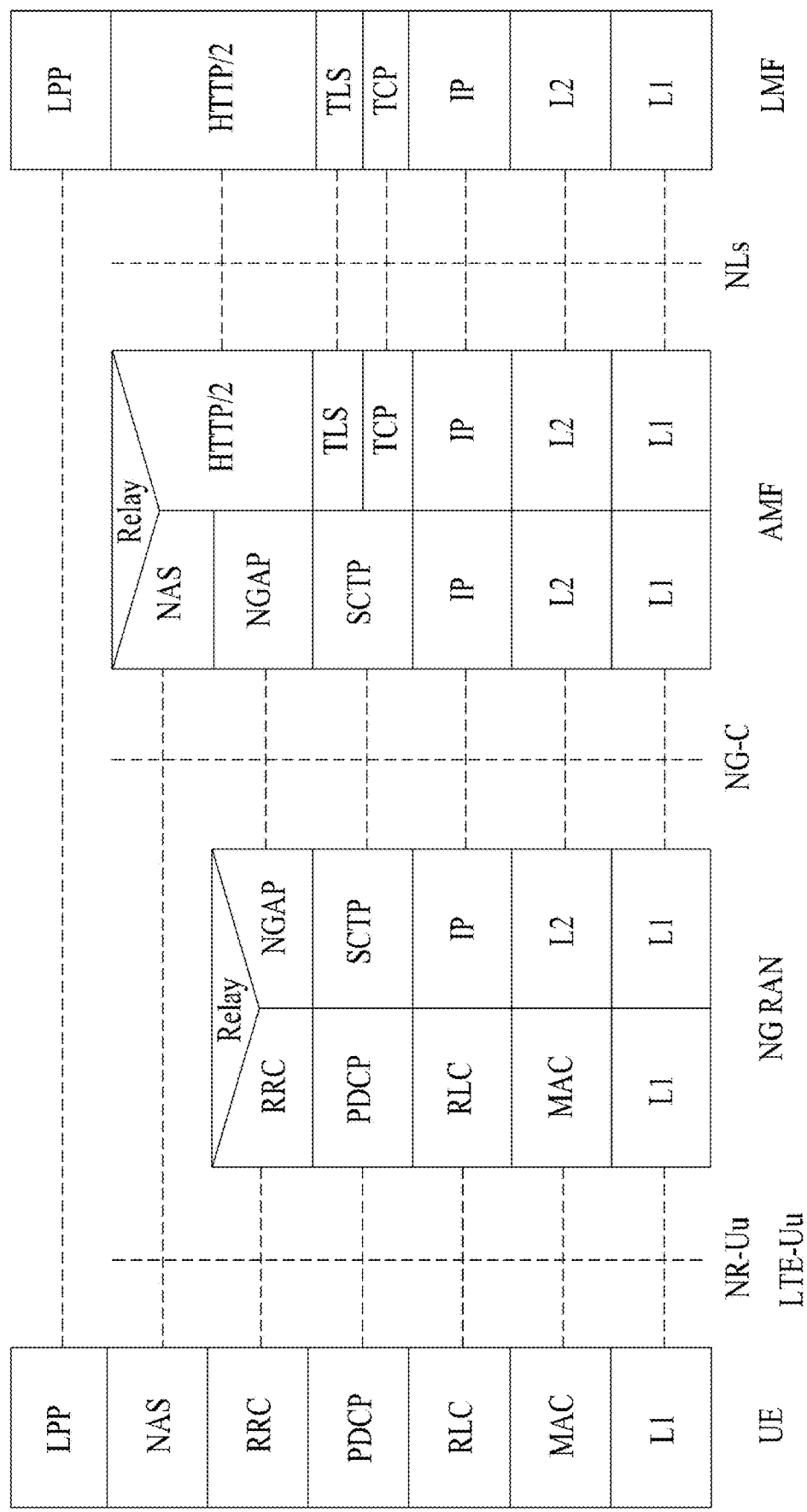
FIG. 9 is a diagram illustrating protocol layers for supporting LTE positioning protocol (LPP) message transmission, to which various embodiments are applicable.

FIG. 9 is a diagram illustrating exemplary protocol layers for supporting LPP message transmission, to which various embodiments are applicable. An LPP PDU may be transmitted in a NAS PDU between an AMF and a UE.

Referring to FIG. 9, LPP is terminated between a target device (e.g., a UE in a control plane or an SUPL enabled UE (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 10:
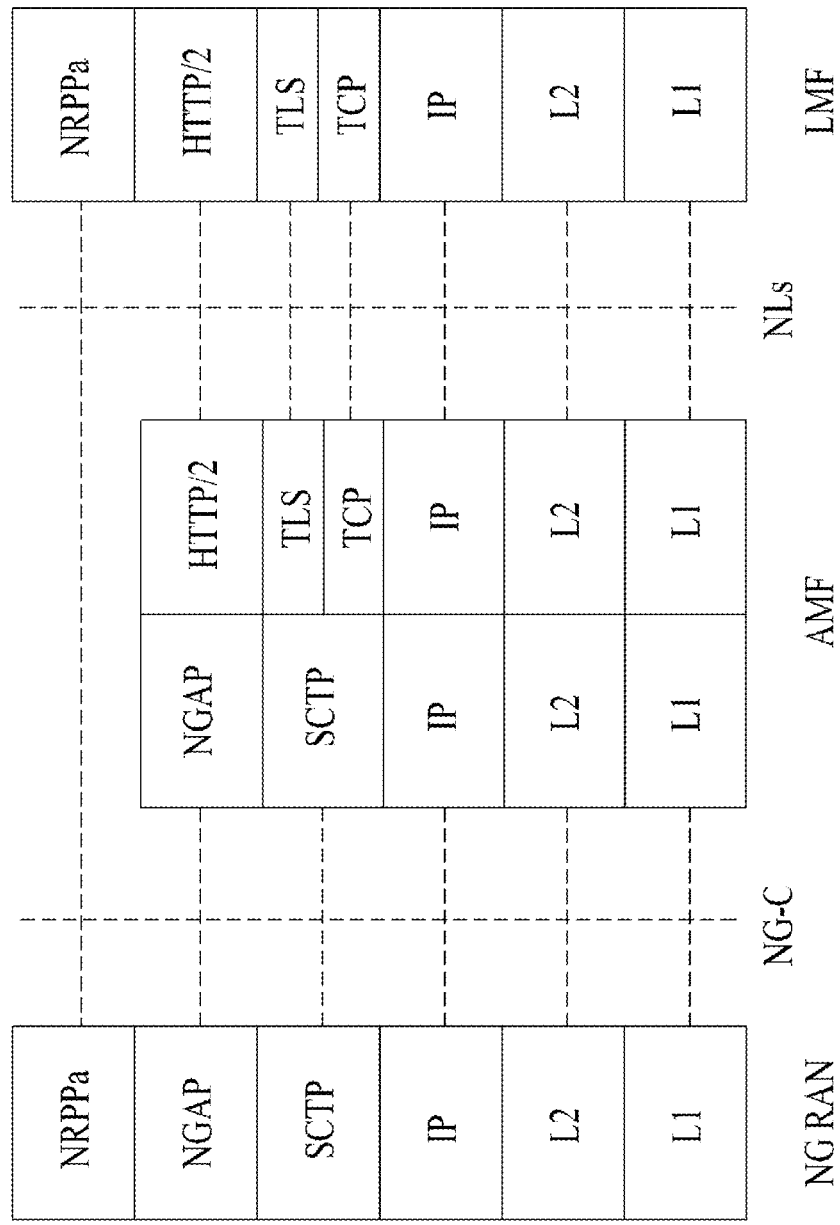
FIG. 10 is a diagram illustrating protocol layers for supporting NR positioning protocol a (NRPPa) protocol data unit (PDU) transmission, to which various embodiments are applicable.

FIG. 10 is a diagram illustrating exemplary protocol layers for supporting NRPPa PDU transmission, to which various embodiments are applicable.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.4. Positioning Measurement Method

Positioning methods supported in the NG-RAN may include a Global Navigation Satellite System (GNSS), an OTDOA, an enhanced cell ID (E-CID), barometric sensor positioning, WLAN positioning, Bluetooth positioning, a terrestrial beacon system (TBS), uplink time difference of arrival (UTDOA) etc. Although any one of the positioning methods may be used for UE positioning, two or more positioning methods may be used for UE positioning.

OTDOA (Observed Time Difference Of Arrival)

Figure 11:
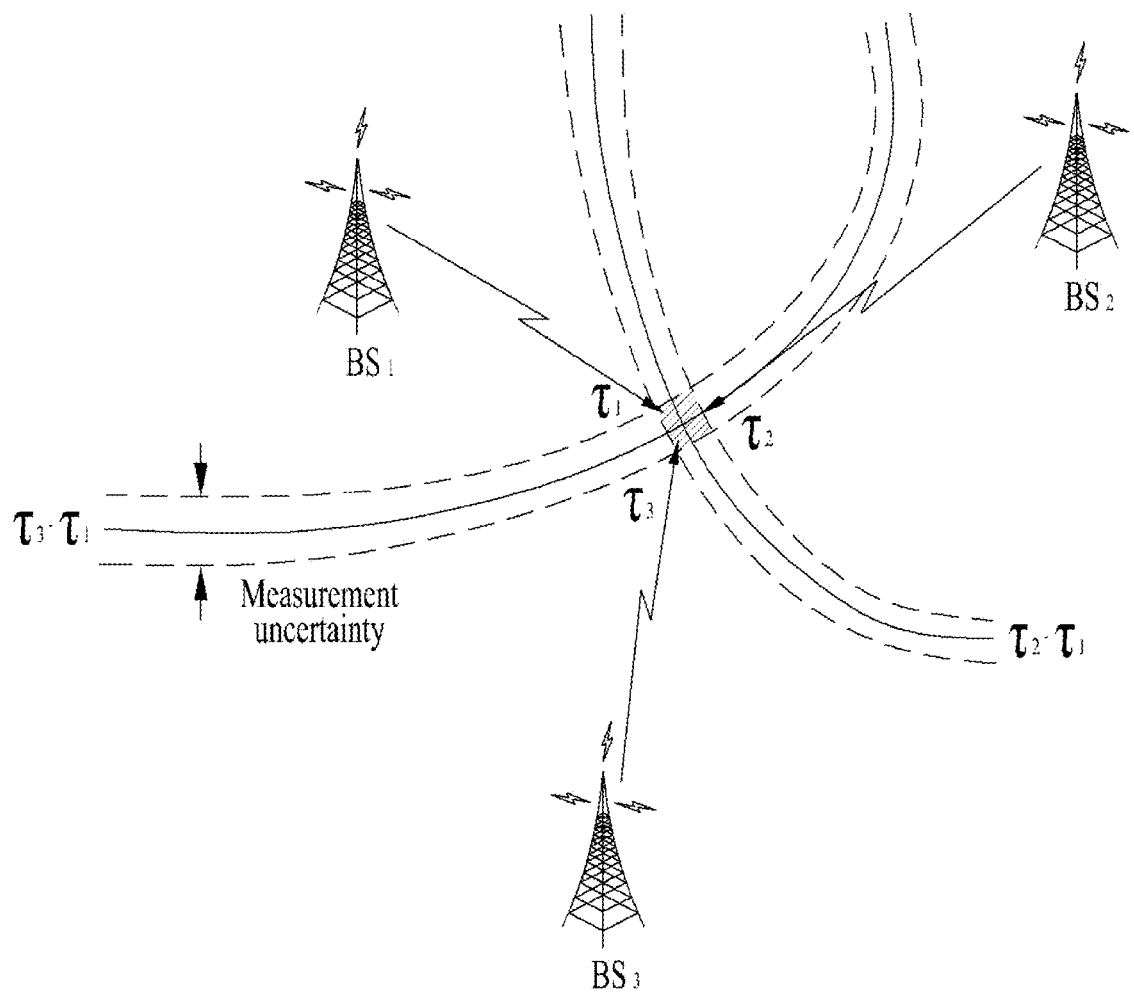
FIG. 11 is a diagram illustrating an observed time difference of arrival (OTDOA) positioning method, to which various embodiments are applicable.

FIG. 11 is a view illustrating an OTDOA positioning method, which may be used in various embodiments.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 5]}$$

where c is the speed of light, {xt, yt} are (unknown) coordinates of a target UE, {xi, yi} are (known) coordinates of a TP, and {x1, y1} are coordinates of a reference TP (or another TP). Here, (Ti-T1) is a transmission time offset between two TPs, referred to as "real time differences" (RTDs), and ni and n1 are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, TADV may be divided into Type 1 and Type 2 as follows.

TADV Type1=(ng-eNB RX-TX time difference)+(UE E-UTRA RX-TX time difference)

TADV Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

FIG. 12 is a diagram illustrating an exemplary multi-round trip time (multi-RTT) positioning method to which various embodiments are applicable.

Referring to FIG. 12(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2-t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 12(*b*), the RTT may correspond to a double-range measurement between the two devices. Positioning estimation may be performed from the information. Based on the measured RTT, d1, d2 and d3 may be determined, and a target device location may be determined to be the intersection of circles with BS1, BS2, and BS3 (or TRPs) at the centers and radiuses of d1, d2 and d3.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AoA: angle of arrival
AoD: angle of departure
ECID: enhanced cell identifier
LMF: location management function
PRS: positioning reference signal
RS: reference signal
RSTD: reference signal time difference/relative signal time difference
RTT: round trip time
ToA: time of arrival
TRP: transmission and reception point (TP: transmission point)
posSIB: positioning system information block (SIB). It may be an SIB including information related to positioning. For example, the posSIB may include assistance data for positioning. For example, the assistance data may be included in a subfield (e.g., SIBpos) in the posSIB. For example, the assistance data may include a PRS identifier (ID) for identifying the DL PRS resource. For example, the assistance data may be configured by the server/LMF, and may be transmitted to the UE in the posSIB via the BS.
SIB: system information block Various embodiments may relate to triggering conditions for positioning measurement on a UE. In the following description of various embodiments, various embodiments are described, taking a positioning method based on PRS measurement as an example. However, various embodiments are not limited thereto.

For example, various measurement methods may be applied to triggering for positioning measurement based on a reference signal (e.g., synchronization signal block (SSB)/CSI-RS (channel state information reference signal, etc.) other than the PRS and/or a method (e.g., a positioning method based on GNSS/barometric pressure sensor/WLAN/Bluetooth/TBS/motion sensor, etc.) other than the method using a reference signal.

In description of various embodiments, the BS may be understood as a comprehensive term including a remote radio head (RRH), an eNB, a gNodeB, a TP, a reception point (RP), and a relay.

In description of various embodiments, a UE-based positioning method may be related to a method by which a UE directly calculates/acquires location/position information thereon.

In description of various embodiments, the UE-assisted positioning method may be related to a method by which the UE calculates/acquires and reports measurements related to UE location/positioning (e.g., values used by the BS/server/LMF for UE positioning; e.g., measured values for one or more of RSTD, AoA, AOD, RTT, and ToA), and the network node (e.g., BS/server/LMF, etc.) that receives this report calculates/acquires location/positioning information on the UE.

For example, one or more of the following details may be considered in order to support DL positioning measurements in the idle/inactive modes:

1) In both UE-assisted and UE-based methods:
   Regardless of the positioning methods (e.g., UE-assisted and UE-based methods), the UE may perform positioning measurement based on information transmitted through RRC information/system information;
   For example, connection may be established only in the minimum SIB, and the minimum SIB may not include the positioning SIB (posSIB);
   For example, when dedicated PRS configuration is allowed, resources may be used more efficiently and/or the location may be more accurately estimated.
2) In the UE-assisted method, the UE may fail to transmit the measurement report when resources for the measurement report are not configured/allocated.

According to various embodiments, in consideration of the above-described matters, dedicated signaling without switching to the RRC connected state may be considered.

According to various embodiments, some procedures (e.g., a paging-related procedure, a RACH-related procedure, etc.) before switching to the RRC connected state may be used. For example, a paging message, and/or message 2, and/or message 3, and/or message A may be used. For example, the WUS may be used for positioning measurement triggering.

Various embodiments may relate to a positioning method (e.g., a UE-based positioning method and/or a UE-assisted positioning method) triggered by the WUS.

Various embodiments may relate to introduction of a WUS mechanism in carrying out a positioning method (e.g., a UE-based positioning method and/or a UE-assisted positioning method) for a UE in an RRC idle/inactive state, and/or a method of using the mechanism. Various embodiments may relate to positioning measurement of a UE in the RRC idle/inactive state using a WUS mechanism.

In wireless communication systems (e.g., a wireless communication system supporting Release 16 and earlier standard technologies), the WUS may be used for power reduction of the UE in NB-IoT and/or MTC, or may be used for RRC-connected UEs to reduce the signaling overhead and/or procedure.

In a wireless communication system (e.g., a wireless communication system supporting Release 16 and/or earlier standard technology) to which various embodiments are applicable, UE positioning may be supported for an RRC connected UE. However, support for positioning of RRC idle/active UEs is considered due to, for example, the need for more accurate management of the location/positioning information about the RRC idle/active UE by the BS/server (location server)/LMF and/or the need for direct management of the location/positioning information by the RRC idle/active UE. For example, by supporting the positioning of the RRC idle/inactive UE, a gain may be obtained in terms of time and/or power required for state transition of the UE.

For example, in the case of an RRC idle/inactive UE, the direct connection between the UE and the BS/server/LMF is limited (for example, there is no LPP connection), and accordingly a positioning mechanism using a predetermined/defined/configured rule/mechanism may be needed. For example, it may be necessary to discuss how to transmit request information on positioning measurement/measurement report (MR)/location information/positioning information to the UE.

For example, it may be difficult to perform accurate position/positioning determination for the RRC idle/inactive UE. In addition, for example, for the RRC idle/inactive UE, a channel on which positioning measurement-related information is transmitted may not be present/configured. Accordingly, a pre-determined/defined/configured reference/rule may be required between the BS/server/LMF and the UE. In addition, a method of distinguishing additional transmitted information and/or the UE may be required. In addition, for example, in the UE-assisted positioning method, the UE should transmit/report measurement results to the BS, and accordingly a resource allocation method for the same may also be required. As another example, even in the UE-based positioning method, a resource allocation method may be required for the UE to transmit/report location information thereof to a BS or the like.

Various embodiments may relate to requesting location information using a WUS when a BS/location server/LMF or the like desires to receive a measurement report from a UE.

For example, when the BS/server/LMF desires to receive a measurement report from the UE, the BS/server/LMF may send a request for location information and/or transmit/deliver request location information to the UE. For example, the request for location information and/or transmission and reception of the request location information may be based on the WUS.

For example, the request for location information and/or the request location information may functionally perform two functions: 1) requesting PRS measurement from the UE (e.g., the BS/server/LMF starts PRS transmission) and 2) transmitting requested contents information in a report from the UE after measurement. For example, the functions of the request for location information and/or request location information may be replaced with the WUS.

Figure 13:
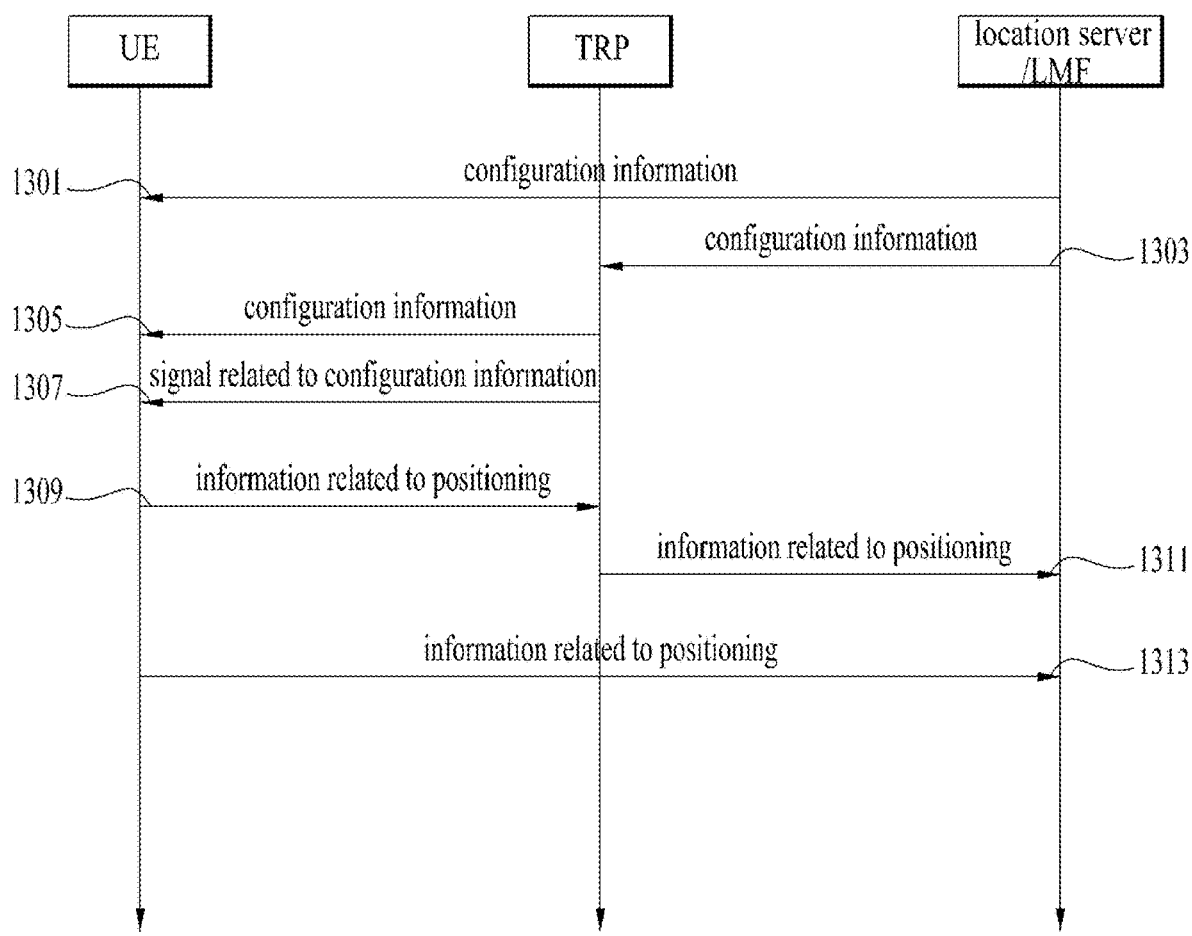
FIG. 13 is a diagram schematically illustrating a method of operating a UE, a transmission and reception point (TRP), a location server, and/or a location management function (LMF) according to various embodiments.

FIG. 13 is a diagram schematically illustrating a method of operating a UE, a TRP, a location server, and/or an LMF according to various embodiments.

Referring to FIG. 13, in operation 1301 according to various embodiments, the location server and/or the LMF may transmit configuration information to the UE, and the UE may receive the same.

In operation 1303 according to various embodiments, the location server and/or LMF may transmit reference configuration information to the TRP, and the TRP may receive the same. In operation 1305 according to various embodiments, the TRP may transmit the reference configuration information to the UE, and the UE may receive the same. In this case, operation 1301 according to various embodiments may be omitted.

Alternatively, operations 1303 and 1305 according to various embodiments may be omitted. In this case, operation 1301 according to various embodiments may be performed.

That is, operation 1301 according to various embodiments and operations 1403 and 1405 according to various embodiments may be optional.

In operation 1307 according to various embodiments, the TRP may transmit a signal related to the configuration information to the UE, and the UE may receive the signal. For example, the signal related to the configuration information may be a signal for positioning of the UE.

In operation 1309 according to various embodiments, the UE may transmit a signal related to positioning to the TRP, and the TRP may receive the same. In operation 1311 according to various embodiments, the TRP may transmit a signal related to positioning to the location server and/or the LMF, and the location server and/or the LMF may receive the same.

In operation 1313 according to various embodiments, the UE may transmit the signal related to positioning to the location server and/or the LMF, and the location server and/or the LMF may receive the same. In this case, operations 1309 and 1311 according to various embodiments may be omitted.

Alternatively, operation 1313 according to various embodiments may be omitted. In this case, operations 1311 and 1313 according to various embodiments may be performed.

That is, operations 1309 and 1211 according to various embodiments and operation 1313 according to various embodiments may be optional.

According to various embodiments, the signal related to the positioning may be acquired based on the configuration information and/or the signal related to the configuration information.

Figure 14:
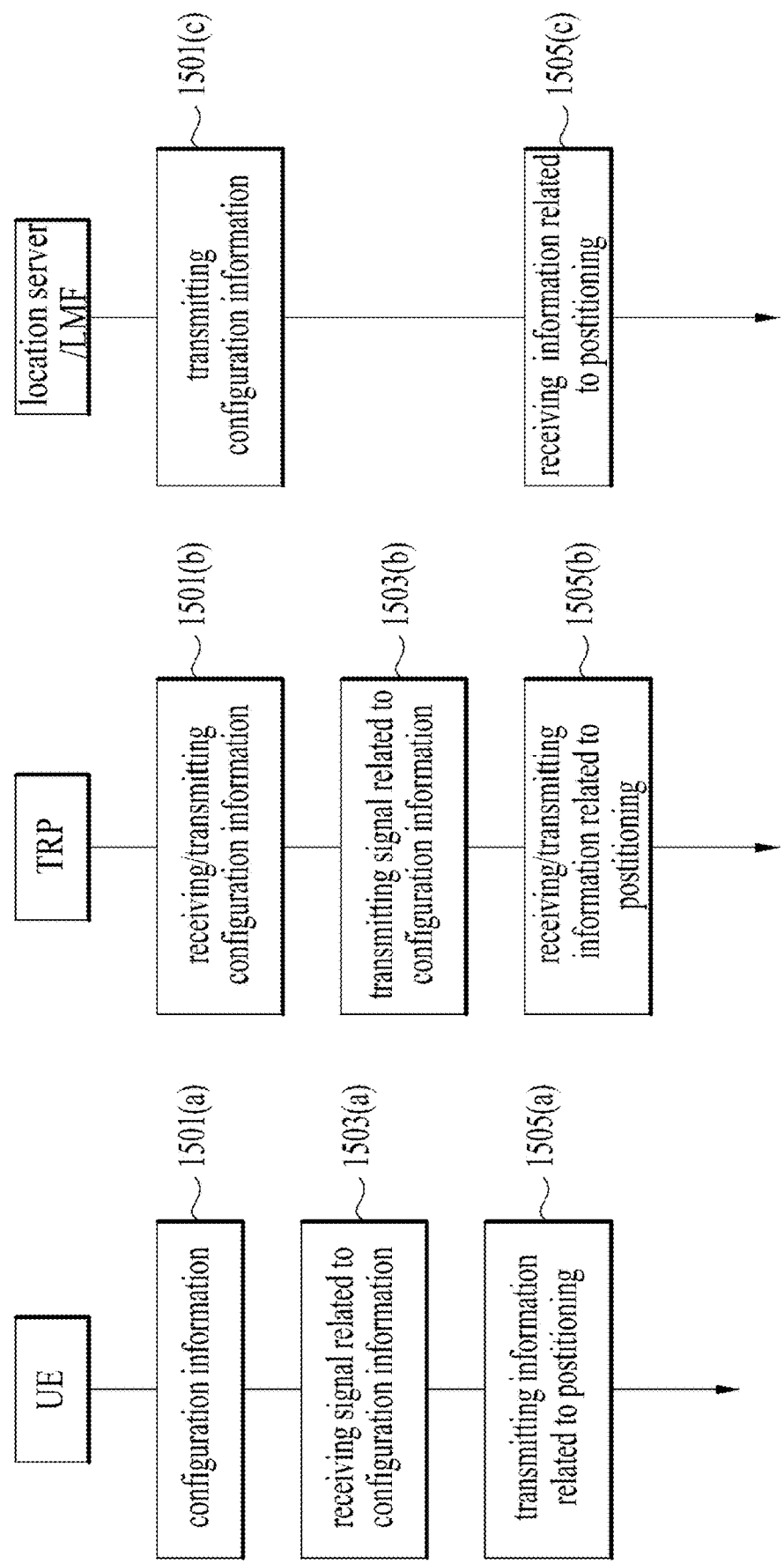
FIG. 14 is a diagram schematically illustrating a method of operating a UE, a TRP, a location server, and/or an LMF according to various embodiments.

FIG. 14 is a diagram schematically illustrating a method of operating a UE, a TRP, a location server, and/or an LMF according to various embodiments.

Referring to FIG. 14-(a), in operation 1401(a) according to various embodiments, the UE may receive configuration information.

In operation 1403(a) according to various embodiments, the UE may receive a signal related to the configuration information.

In operation 1405(a) according to various embodiments, the UE may transmit information related to positioning.

Referring to FIG. 14-(b), in operation 1401(b) according to various embodiments, the TRP may receive configuration information from the location server and/or the LMF, and may transmit the same to the UE.

In operation 1403(b) according to various embodiments, the TRP may transmit a signal related to the configuration information.

In operation 1405(b) according to various embodiments, the TRP may receive information related to positioning, and may transmit the same to the location server and/or LMF.

Referring to FIG. 14-(c), in operation 1401(c) according to various embodiments, the location server and/or the LMF may transmit configuration information.

In operation 1405(c) according to various embodiments, the location server and/or LMF may receive information related to positioning.

For example, the configuration information may be understood as being related to reference configuration (information), one or more pieces of information that the location server, and/or the LMF, and/or the TRP transmits/configures to the UE, or the like, or may be understood as the reference configuration (information), one or more pieces of information that the location server, and/or the LMF, and/or the TRP transmits/configures to the UE, or the like in the description of various embodiments given below. For example, the configuration information may be related to downlink control information (DCI) including an information element (IE), and/or the WUS, and/or the paging message, and/or the system information, and/or the random access response (RAR) as in the description of various embodiments below, or may be understood as the DCI, and/or the WUS, and/or the paging message, and/or the system information, and/or the RAR.

For example, the signal related to positioning described above may be understood as a signal related to one or more pieces of information reported by the UE in the description of various embodiments below and/or a signal including one or more pieces of information reported by the UE.

For example, in the description of various embodiments below, a BS, a gNB, a cell, or the like may be replaced with a TRP, a TP, or any device that performs the same function.

For example, in the description of various embodiments given below, the location server may be replaced with an LMF or any device that performs the same function.

More specific operations, functions, terms, and the like in operations according to various embodiments may be performed and described based on various embodiments to be described below. Operations according to each of the various embodiments are exemplary, and one or more of the above-described operations may be omitted according to the details of each embodiment.

As an example, when the UE operates based on the UE-based positioning method, at least one of operations 1309, 1311, 1313, 1405(*a*), 1405(*b*), or 1405(*c*) according to various embodiments may be skipped.

As another example, when the UE operates based on the UE-based positioning method and is instructed by the BS/LMF/position server to report positioning information, at least one of operations 1309, 1311, 1313, 1405(*a*), 1405 (*b*), or 1405(*c*) according to various embodiments may be performed.

Hereinafter, various embodiments will be described in detail. Various embodiments to be described below may be combined in all or in part to form other various embodiments as long as they are not mutually excluded, which may be clearly understood by those skilled in the art.

Various embodiments may relate to a method of performing positioning measurement using a WUS for a UE in an RRC idle/inactive state.

For example, the BS/server/LMF may transmit related information (e.g., assistance data) positioning measurement of a connected UE. For example, the related information for the positioning measurement may be transmitted/broadcast in a system information block (SIB). For example, the assistance data may include information that is needed to support the UE-based positioning method and/or UE-assisted positioning method, and/or may include configuration information about the PRS and/or information about a serving/reference/neighbor cell.

For example, when the BS/server/LMF desires to receive a measurement report (MR) from the UE, it may request location information and/or transmit/deliver request location information.

For example, the request for location information and/or the request location information may functionally perform two functions: 1) requesting PRS measurement from the UE (e.g., the BS/server/LMF starts PRS transmission) and 2) transmitting requested contents information in a report from the UE after the measurement.

Various embodiments may relate to alternatively performing the function of a request for location information and/or request location information using a WUS.

According to various embodiments, the UE in the RRC idle/inactive state may wake up prior to a predetermined gap of its paging occasion (PO) in a DRX cycle and receive/detect/decode a corresponding WUS. According to various embodiments, the UE may perform positioning measurement according to one or more of the methods according to various embodiments described below, and/or receive/detect/decode PDCCH for paging, and/or transition to a sleep mode.

According to various embodiments, the WUS may configure/indicate whether the UE should decode the PDCCH for the purpose of reducing power consumption related to paging, and may be transmitted when the BS/server/LMF desires to acquire location information about a specific UE in the RRC idle/inactive state.

According to various embodiments, the operation of the UE and the BS/server/LMF may vary depending on the UE-based positioning method and the UE-assisted positioning method. As another example, the same operation may be applied to both the UE-based positioning method and the UE-assisted positioning method, and/or at least a part of operations according to the UE-based positioning method may be combined with at least a part of operations according to the UE-assisted positioning method according to various embodiments described below.

CASE 1: UE-Based Position Method

According to various embodiments, in the UE-based positioning method, the UE may perform measurement based on the acquired assistance data and directly calculate/acquire location information thereof. For example, in the UE-based positioning method, the UE may not need to report the result of the measurement to the BS/server/LMF, and thus resources required for reporting by the UE may not be allocated.

According to various embodiments, the UE may acquire assistance data (through RRC information/system information) and enter a sleep mode. According to various embodiments, when it is necessary to instruct/configure the UE to periodically/aperiodically update location information for management of the location of the UE transitioned to the sleep mode, the BS/server/LMF may instruct/configure the UE based on one or more of the methods according to various embodiments, and the UE may perform positioning measurement based on the method. For example, the BS/server/LMF may transmit a WUS to the UE before transmitting the PDCCH for the paging message. For example, information about the WUS (e.g., configuration information related to the WUS) may be transmitted and received through RRC information/system information.

Figure 15:
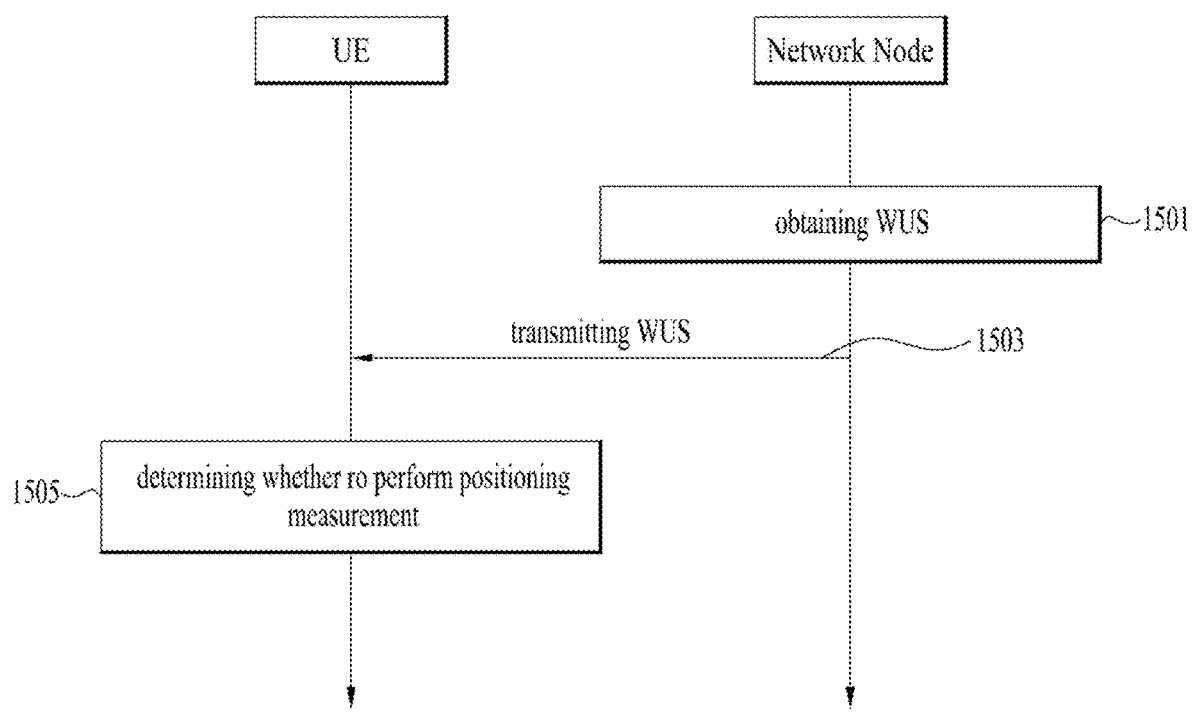
FIG. 15 is a diagram schematically illustrating an operation method of a UE and a base station according to various embodiments.

FIG. 15 is a diagram schematically illustrating a method of operating a UE and a BS according to various embodiments.

Referring to FIG. 15, in operation 1501 according to various embodiments, the BS may acquire/generate a WUS. According to various embodiments, the WUS may include information about whether to perform positioning measurement and/or information for triggering positioning measurement for the UE. According to various embodiments, the WUS may be a DCI-based WUS and/or a sequence-based WUS.

In operation 1503 according to various embodiments, the BS may transmit the WUS, and the UE may receive the WUS.

In operation 1505 according to various embodiments, the UE may determine whether to perform positioning measurement based on the WUS.

Hereinafter, various embodiments will be described in detail. Examples of a positioning measurement method using the WUS according to various embodiments may be configured as follows:

Alt.1: WUS based on DCI

According to various embodiments, DCI for the WUS, and/or related to WUS, and/or performing the function/role of the WUS may be used in a positioning measurement method. For example, the DCI may be DCI including information related to a wake-up indication.

Hereinafter, DCI format 2_6 is described as an example of the DCI. However, this is a specific example of various embodiments, and the format of the DCI is not limited thereto. For example, DCI format 2_6 described in the following various embodiments may be replaced with DCI and/or a signal for the WUS, and/or related to, and/or performing the function/role of the WUS, and/or DCI and/or a signal including information related to wake-up indication.

For example, in a wireless communication system (e.g., an NR system) to which various embodiments are applicable, whether the UE wakes up or not may be indicated before paging, using DCI format 2_6. For example, the DCI format 2_6 may include an indication about whether the UE wakes up or not (and/or an indication of state maintenance for PDCCH monitoring and/or transition to the sleep mode). For example, a decrease in latency and/or resource overhead may be achieved by indicating whether the UE wakes up or not before paging, using DCI format 2_6.

For example, DCI format 2_6 may be used to deliver power saving information outside the DRX active time for one or more UEs. For example, DCI format 2_6 may have a cyclic redundancy check (CRC) scrambled with power saving-RNTI (PS-RNTI). DCI format 2_6 may include one or more of the following kinds of information.

Block number 1, block number 2 . . . , block number N. For example, a start position of a block may be determined by a parameter PSPositionDCI2-6 provided from an upper layer for a UE for which the block is configured.

For example, when higher layer parameters PS-RNTI and dci-Format2-6 are configured for the UE, one block may be configured for the UE, and the following fields may be defined for the block.

Wake-up indication: 1 bit. For example, the bit set to '0' (or '1') may correspond/be mapped to "Off" (and/or disabled) (which may correspond to PDCCH monitoring related to paging not being indicated and/or PDCCH related to paging not being monitored). The bit set to '1' (or '0') may correspond/be mapped to "On" (and/or enabled) (which may correspond to PDCCH monitoring related to paging being indicated and/or PDCCH related to paging being monitored).

SCell dormancy indication: For example, if a higher layer parameter Scell-groups-for-dormancy-outside-active-time is not configured, the indication may be 0 bit. Otherwise, it may be a bitmap of 1, 2, 3, 4, or 5 bits determined by Scell-groups-for-dormancy-outside-active-time. For example, each bit may correspond to one of the SCell groups configured by the higher layer parameter Scell-groups-for-dormancy-outside-active-time. As the bits from the most significant bit (MSB) to the least significant bit (LSB) in the bitmap may correspond to the SCell groups from the first SCell group to the last SCell group.

For example, the size of DCI format 2_6 may be indicated by a higher layer parameter SizeDCI_2-6.

According to various embodiments, positioning measurement may be indicated to the UE using a DCI field (IE: information field) in DCI (e.g., DCI format 2_6) for the WUS. According to various embodiments, a search space (e.g., a block number n) to be monitored by the UE may be UE-specifically and/or group-specifically configured from a higher layer.

According to various embodiments, one block may include a wake-up indication bit and/or an SCell dormancy indication bit. It may further include an indication bit for positioning (e.g., a positioning indication (1 bit)).

According to various embodiments, the UE may perform a subsequent operation according to the bit information. For example, according to the bit information, the UE may perform detection/monitoring through/on the PRS through the PRS (and/or perform positioning measurement based on the PRS), and/or perform detection/monitoring on the PDCCH for paging, and/or transition to the sleep mode.

According to various embodiments, the positioning indication bit (e.g., 1 bit of positioning indication) may indicate that the BS transmits the PRS after a corresponding time (e.g., the time when DCI including the positioning indication bit is transmitted, the search space in which the DCI is transmitted and received, and/or the control resource set (CORESET)), and may indicate that the PRS should be detected/monitored/measured after the corresponding time from the perspective of the UE.

According to various embodiments, the value of the positioning indication bit may indicate the status of positioning measurement of the UE, and/or the status of transmission/measurement/monitoring of the PRS, and/or on/off (enabled/disabled) thereof may be indicated by the values of the positioning measurement bit.

For example, when the positioning indication bit has a 1-bit size, the bit set to '1' (or '0') may correspond/be mapped to "On" (and/or "enabled"). In this case, the positioning instruction bit may indicate that the BS transmits the PRS and/or that the UE will perform positioning measurement and/or PRS measurement/monitoring.

For example, if the positioning indication bit is a 1-bit size, when the positioning indication bit has a 1-bit size, the bit set to '0' (or '1') may correspond/be mapped to "Off" (and/or "disabled"). In this case, the positioning indication bit may indicate that the BS does not transmit the PRS and/or that the UE will skip positioning measurement and/or PRS measurement/monitoring. Such a mapping/correspondence relationship according to various embodiments may be summarized as shown in Table 4 below.

TABLE 4

| Bit field mapped to index | Positioning measurement |
|---|---|
| 0 | Disabled |
| 1 | Enabled |
| and/or | |
| Bit field mapped to index | Positioning measurement |
| 0 | Enabled |
| 1 | Disabled |

For example, when the 1 bit of the wake-up indication does not indicate monitoring of the PDCCH for reception of a paging message (e.g., the value of the bit is '0' (or '1') and the 1 bit of the positioning indication corresponds/is mapped to "On" (e.g., "enabled"), the UE may skip monitoring the PDCCH and/or maintain the wake-up state. Thus, it may monitor the PRS (and/or expect (reception of PRS)) and/or perform measurement based on assistance data transmitted through the RRC information/system information.

For example, when both the 1 bit of the wake-up indication and the 1 bit of the positioning indication corresponds/are mapped to "On" (and/or "enabled"), the UE may receive PDCCH monitoring and a paging message and perform positioning measurement, and/or may perform positioning measurement and receive PDCCH monitoring and a paging message.

In the above description of various embodiments, an exemplary case where the size of the positioning indication bit is 1 bit has been described. However, various embodiments are not limited thereto. According to various embodiments, the size of the positioning indication bit may have various values other than 1 bit. For example, when the positioning indication bit is set to a first value, it may correspond/be mapped to "On" (and/or "enabled"). When the positioning indication bit is set to a second value, it may correspond/be mapped to "Off" (and/or "disabled"). For example, when the positioning indication bit is set to a value other than the first value and the second value, it may correspond to/be mapped to reserved, and/or be used to transmit another indication/configuration to the UE.

Figure 16:
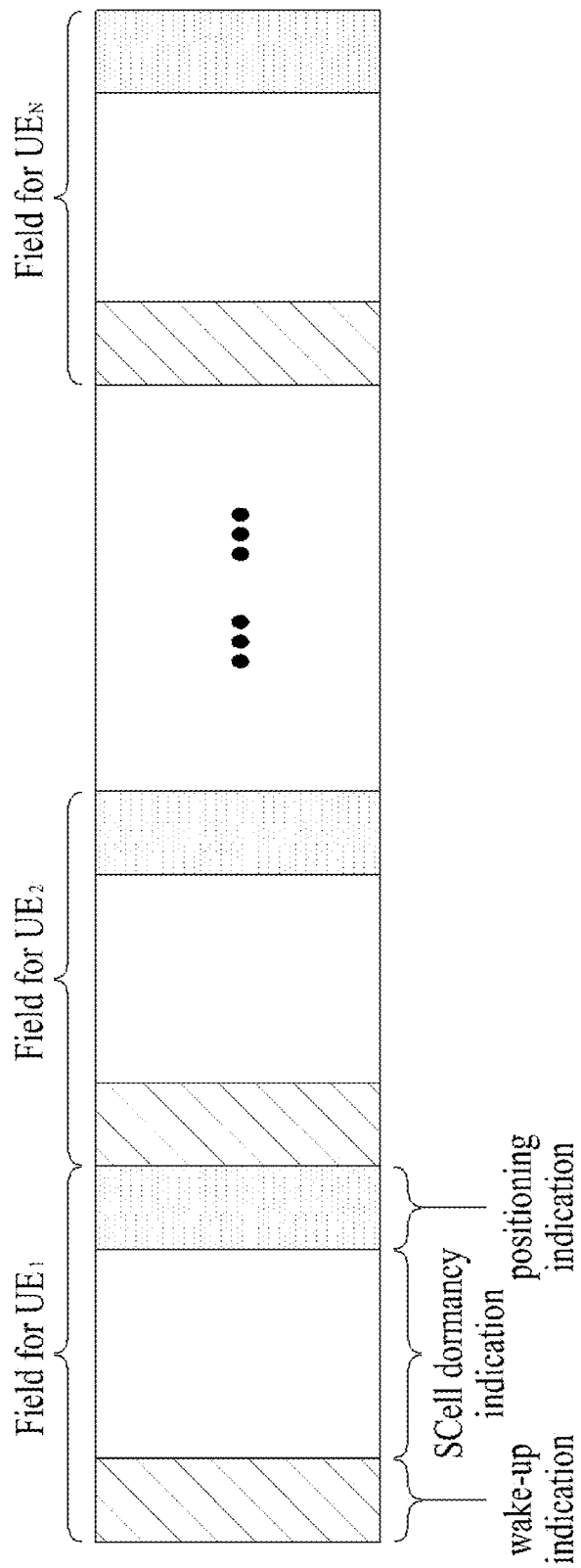
FIG. 16 is a diagram illustrating an example of a structure of DCI according to various embodiments.

FIG. 16 is a diagram illustrating an example of a structure of DCI according to various embodiments.

Referring to FIG. 16, DCI according to various embodiments may include a wake-up indication, an SCell dormancy indication, and/or a positioning indication. According to various embodiments, the wake-up indication, the SCell dormancy indication, and the positioning indication may all be included in the DCI, and/or one or more of the indications may be omitted. The structure in FIG. 16 is merely exemplary, and the arrangement order of the wake-up indication, the SCell dormancy indication, and the positioning indication may vary.

According to various embodiments, the DCI may be configured for one or more UEs and/or a group including one or more UEs to reduce resources/signaling overhead. According to various embodiments, the DCI may include a field for each of the one or more UEs. According to various embodiments, each of the fields for each of the one or more UEs may include one or more of a wake-up indication, an SCell dormancy indication, and/or a positioning indication. According to various embodiments, the UE receiving the DCI may operate according to one or more of the wake-up indication, the SCell dormancy indication, and the positioning indication in the field corresponding thereto.

Alt.2: WUS Based on Sequence

According to various embodiments, a method using a sequence-based WUS (e.g., a WUS related to an NB-IoT system, and/or a WUS related to an MTC system, and/or a WUS in a general wireless communication system other than the NB-IoT/MTC system may be used, but embodiments are not limited thereto). The BS/server/LMF may configure/indicate measurement for the UE through a sequence-based signal (sequence-based WUS).

For example, the UE may attempt to detect/decode the WUS by waking up before its own paging occasion (PO). When there is no WUS detected/decoded before the PO, the UE may skip PRS measurement. As another example, when the WUS is detected/decoded, the UE may perform PRS measurement at a time/frequency resource at which the PRS is transmitted after the corresponding time (e.g., the time when the WUS is detected/decoded).

According to various embodiments, a WUS for positioning may be defined. For example, when WUS is used to reduce power of the RRC idle/inactive UE in an applicable wireless communication system (e.g., the NR system), it may be defined as a normal WUS (NWUS), and a positioning WUS (PWUS) for positioning may be additionally defined to be distinguished therefrom.

According to various embodiments, the PWUS and the NWUS may be divided by a definition/rule predetermined/preconfigured between the UE and the BS. For example, the PWUS and the NWUS may be distinguished by time/frequency resources at which they are transmitted, and/or distinguished in the code domain, and/or distinguished by a sequence/colocation.

For example, when both the PWUS and the NWUS are detected by a UE, the UE may expect to receive a paging message and also expect to receive (and/or detect/measure) a PRS prior to a subsequent random access procedure (RACH procedure).

For example, when only the PWUS is detected, the UE may skip detection/decoding of PDCCH for paging and may expect PRS reception (and/or PRS detection/measurement). For example, when the gap between the WUS measurement and the PRS measurement is large (e.g., the size of the gap is greater than or equal to a predetermined/defined size), the UE may repeat the transition to the sleep mode within the gap, rather than continuously maintaining the wake-up mode. For example, the transition between the wake-up mode and the sleep mode may be repeated.

For example, a UE that has failed to detect any of the PWUS and the NWUS may switch to the sleep mode and expect reception of a PWUS and/or a NWUS in the next DRX cycle.

The WUS-based positioning indication/triggering method according to various embodiments may be applied not only to the UE-based positioning method but also to the UE-assisted positioning method. For example, when positioning measurement is indicated/triggered from the WUS for the UE, the UE may acquire location/positioning information about the UE based on the positioning measurement and/or acquire a measured value for the location/positioning information about the UE.

CASE 2: UE-Assisted Position Method

In the UE-assisted positioning method (Case2), which is different from the UE-based positioning method (Case1) in which the UE according to various embodiments performs positioning measurement based on the PRS and directly calculates/determines/acquires the location thereof, the UE may perform measurement, and then deliver/report/transmit the result thereof to the BS/server/LMF. Therefore, in the UE-assisted positioning method (Case2) in contrast with the UE-based positioning method (Case1), it may be necessary to indicate/configure/allocate a time/frequency resource at which the measurement result is transmitted.

According to various embodiments, PRS measurement is basically indicated to the UE by the above-described DCI and/or sequence-based WUS. If a reserved bit is present in the DCI field, it may be used to directly indicate a positioning method (e.g., OTDOA/ECID/Multi-RTT/GNSS/Barometric pressure sensor/WLAN/Bluetooth/TBS/motion sensor, etc.). For example, the positioning method indication based on the reserved bit of the DCI field may be applied to a DCI-based WUS-related embodiment among various embodiments described above. For example, in the case of a sequence-based WUS, the positioning method may be indicated based on the sequence-based WUS (e.g., the signal may contain a bit related to the positioning method, and/or a bit value related to the positioning method may be used in the sequence generation process), and/or additional signaling/information related to the positioning method indication may be introduced.

According to various embodiments, the positioning method may vary depending on the applied system. For example, the type of positioning method that may be indicated by the DCI field may vary depending on the system. For example, one of positioning methods that may be supported by the UE/system may be indicated.

For example, execution of positioning measurement may be indicated/triggered to the UE from the DCI used as the WUS. For example, a positioning method to be used by the UE to perform positioning measurement may be indicated from one or more of the reserved bits in the DCI used as the WUS. For example, the UE may perform positioning measurement based on the indicated positioning method.

For example, in the UE-assisted positioning method, the UE needs to perform measurement and transmit a result value. Accordingly, in this case, many advantages may be obtained through methods according to various embodiments.

According to various embodiments, the BS/server/LMF may directly indicate the type of measurement to the UE. For example, a positioning method to be performed by the UE may be indicated/configured in a bitmap. For example, an additional bit may be allocated for each positioning method (e.g., OTDOA/ECID/Multi-RTT/GNSS/barometric pressure sensor/WLAN/Bluetooth/TBS/motion sensor, etc.). For example, the value of each bit contained in the bitmap being '0' (or '1') may correspond/be mapped to an indication that the positioning method mapped/corresponding to each bit is "Off" (and/or "disabled"). The value being '1' (or '0') may correspond/be mapped to an indication that the positioning method mapped/corresponding to each bit is "On" (and/or "enabled"). For example, the BS/server/LMF may indicate a positioning method using "on"/"off" (and/or "enable"/"disabled") of the corresponding bit, and the UE may carry out only the indicated positioning method.

According to various embodiments, the BS/server/LMF may transmit/deliver only information related to the bitmap separately and/or later, and the UE may use the same in data decoding. For example, N bits for N positioning methods, not the positioning indication bit (e.g., 1 bit for positioning indication) described above, may be allocated. For example, when all bits included in the corresponding bits (N bits) are set to '0' (and/or '1'), this may mean that the WUS does not indicate the positioning measurement. For example, if any of the bits included in the bits (N bits) is "On" (and/or '1' (and/or '0'), "enabled"), the UE may use a positioning method associated with/mapped/corresponding to the "On" bit to transmit a result value for the positioning method through a specified/allocated resource according to various embodiments. According to various embodiments, a positioning method to be carried out by the UE may be configured/indicated in a bitmap. In this case, the positioning indication bit described above may not be separately required. In this case, the positioning indication bit in the description of various embodiments described above may be changed to a bitmap indicating a positioning method. As another example, according to various embodiments, both the positioning indication bit and the bitmap indicating the positioning method may be separately included.

According to various embodiments, the amount of information exchanged between the UE and the BS/server/LMF may be significantly reduced.

A resource allocation method for a resource used for reporting a result by a UE after measurement and/or transmission of content to be transmitted at the resource according to various embodiments may be based on one or more of the following methods:

Alt 1. Paging Message

According to various embodiments, resources related to measurement reporting of the UE may be specified/allocated using a paging message (e.g., PDSCH). For example, since the UE is in the RRC idle/inactive state, in order to improve reception performance from the BS perspective, the UE may encode and transmit data using a fixed low modulation order (e.g., a modulation order below a specific value and/or a modulation and coding scheme (MCS)). For example, the BS may configure a required time/frequency based on the fixed MCS and transmit the same in the paging message. For example, the required time/frequency may be for time/frequency resources related to/required for measurement report (resource configuration related to time/frequency resources, etc.). In addition, for example, the BS/server/LMF may transmit the report contents (target contents, which may be delivered through, for example, an LPP protocol/LPP message or the like) and/or resource configuration for time/frequency resources through a paging message. For example, when resource configuration is indicated using the corresponding method, the UE receiving the PWUS may expect decoding of the next paging PDCCH and/or PDSCH (paging message).

Alt 2. RAR (Random Access Response)

According to various embodiments, a measurement resource may be specified/indicated from the BS to the UE through an RAR-related message (e.g., message 2, message B, etc.) during the RACH procedure. Hereinafter, message 2 in a 4-step RACH will be described as an example, but it should be noted that various embodiments may also be applied to message B in a 2-step RACH.

For example, the BS may include UL grant related to message 3 and UL grant information about measurement reporting in message 2.

For example, the BS may transmit to the UE message 2 containing a UL grant for scheduling a measurement report in addition to a UL grant for scheduling message 3.

For example, considering that the preamble may be used in duplicate by multiple/a plurality of UEs, the time advance (TA)/MCS/power command may be reported by applying a fixed value and/or a value transmitted from the RAR. Here, for example, when the same preamble is selected, there may be a UE measuring the PRS and a UE failing to measure the PRS.

For example, the UE that receives the PWUS and measures the PRS may transmit the measurement result through UL grant information for reporting the measurement result.

For example, a UE that does not receive the PWUS and/or fails to measure the PRS may ignore the corresponding UL grant information. For example, the UE that does not receive the PWUS and/or fails to measure the PRS may skip transmitting/reporting a report at a resource corresponding to the UL grant or scheduled by the UL grant, or cancel/ignore/drop the same.

Alt 3. Using Combination of Paging Message and RAR

According to various embodiments, a paging message and a message related to RAR may be used. Hereinafter, message 2 in a 4-step RACH will be described as an example, but it should be noted that various embodiments may be applied even to message B in a 2-step RACH.

For example, when only one message (e.g., a paging message or a message related to the RAR) is used, and the amount of information of the target contents to be assigned resources and reported in a single message is large (for example, the amount of information is large as not to be entirely contained in a single message), the simultaneous transmission may be difficult and/or restricted.

According to various embodiments, in consideration of this feature, resource allocation information about measurement reporting and information about a result (target contents) to be reported may be separated may be divided into the paging message and the RAR and transmitted.

For example, information about a result to be reported by the UE may be transmitted through a paging message. For example, resource information required for reporting may be transmitted through the RAR.

For example, the information about the result to be reported by the UE may be transmitted through the RAR. For example, resource information required for reporting may be transmitted through a paging message.

Alt 4. Using Combination of System Information and Paging Message and/or RAR

According to various embodiments, system information (e.g., PosSIB) and a paging message or a message related to RAR may be used.

For example, when the amount of content for the UE to report is large (for example, the amount of information is large as not to be entirely contained in a single message), it is difficult to perform transmission (of contents) through the paging message or the message related to the RAR, and/or the information does not semi-persistently frequently change, system information (e.g., PosSIB) and the paging message or the RAR-related message may be used.

According to various embodiments, the BS/server/LMF may transmit, through system information (e.g., PosSIB), information about a result to be reported by the UE. According to various embodiments, the BS/server/LMF may transmit, through a paging message and/or RAR, information about a resource at which the UE will reports the measurement result. According to various embodiments, the UE may report the measured/acquired result to the BS/server/LMF through the resource for reporting of the measured result in consideration of a valid resource and the PRS measurement result in the UE. According to various embodiments, the "valid resource" may mean a resource at which the UE may report the measurement result. For example, even if a resource is configured by the BS/server/LMF for reporting of the measurement result, the measurement result may not be reported at the configured resource due to overlapping with other UL signal/channel transmission and/or the low priority thereof compared to that of the other UL signal/channel transmission. For example, the "valid resource" may be understood as resources except for those at which the measurement result cannot be reported, among the resources configured for reporting of the measurement result.

According to various embodiments, in one or more of Alt.1 to Alt.4, the BS/server/LMF may limit the report contents and/or the target contents. According to various embodiments, the BS/server/LMF may limit the report contents and/or the target contents to reduce the amount of information to be reported by the UE. For example, this may mean that the report contents and/or target contents for the RRC idle/inactive UE may be limited more than for the RRC connected UE.

For example, the RRC connected UE may be configured to report information about a measured value (e.g., RSTD, RTT, etc.), information about a PRS resource ID used to acquire the measured value, information about a PRS resource set ID used to acquire the measured value, information about a time stamp, and information about quality of the measured value. For example, compared to the RRC connected UE, the RRC idle/inactive UE may be configured to report only the information about the measured value. As another example, the RRC idle/inactive UE may be configured to report only the information about the measured value, the information about the PRS resource ID, and the information about the PRS resource set ID used to acquire the measured value.

In descriptions of various embodiments, the report contents and/or the target contents may be interchangeably used, and may mean information to be reported by the UE in relation to measurement for positioning. For example, one or more of information about a PRS resource ID used to acquire RSTD, RTT, or a measured value, information about a PRS resource set ID used to acquire the measured value, information about a TP used to acquire the measured value, information about a time stamp, or information about quality of the measured value may be the report contents and/or target contents, but are not limited thereto.

The resource allocation method according to various embodiments may be applied not only to the UE-assisted positioning method but also to the UE-based positioning method. For example, when positioning measurement is indicated/triggered from the WUS for the UE, the UE may acquire location/positioning information about the UE based on the positioning measurement and/or acquire a measured value for the location/positioning information about the UE, and may transmit/report the location/positioning information about the UE and/or the measured value through an allocated resource based on one or more methods according to various embodiments.

For example, in the UE-based positioning method, even if the UE calculates/acquires the location thereof through direct positioning measurement, the BS/server/LMF may desire to receive a report on the calculated/acquired location from the UE. To this end, according to various embodiments, an additional bit (a bit indicating whether to report location information) (e.g., 1 bit) may be transmitted. For example, the bit may be transmitted based on the DCI-based WUS and/or sequence-based WUS described above.

For example, the reporting status of the UE may vary according to "on"/"off" (and/or "enabled"/"disabled") of the bit. For example, when the value of the bit corresponds to "on" (and/or "enabled") (e.g., '1' (or '0')), the UE may report the calculated/acquired location thereof. For example, when the value of the bit corresponds to "off" (and/or "disabled") (e.g., '0' (or '1')), the UE may not report the calculated/acquired location thereof.

For example, the time/frequency resource and/or MCS information at which the calculated/acquired location will be reported according to "on"/"off" (and/or "enabled"/"disabled") of the bit may be transmitted through a paging messages, and/or message 2 (and/or message B), and/or system information. For example, the UE may report the location thereof based on the received time/frequency resource and/or MCS information. For example, when the value of the bit corresponds to "on" (and/or "enabled"), the time/frequency resource and/or MCS information for reporting of the location information may be included in the paging message, and/or message 2 (and/or message B), and/or the system information. For example, when the value of the bit corresponds to "off" (and/or "disabled"), the time/frequency resource and/or MCS information may not be included in the paging message, and/or message 2 (and/or message B), and/or the system information.

In the above description of various embodiments, an exemplary case where the size of the bit indicating whether to report location information is 1 bit have been described, but various embodiments are not limited thereto. According to various embodiments, the size of the bit indicating whether to report location information may have various values other than 1 bit. For example, when the bit indicating whether to report location information is set to a first value, it may correspond/be mapped to "on" (and/or "enabled"). When the bit indicating whether to report location information is set to a second value, it may correspond/be mapped to "off" (and/or "disabled"). For example, when the bit indicating whether to report location information is set to a value other than the first value and the second value, it may correspond to/be mapped to reserved, and/or be used to transmit another indication/configuration to the UE.

According to various embodiments, whether the UE is to report location information and/or on/off (enabled/disabled) thereof may be indicated by a value of the bit indicating whether to report location information.

For example, when the bit indicating whether to report location information has a 1-bit size, the value of thereof set to '1' (or '0') may correspond/be mapped to "on" (and/or "enabled"). In this case, the bit indicating whether to report the location information may indicate that the UE should report the calculated/acquired location information thereof to the BS/server/LMF.

For example, when the bit indicating whether to report location information has a 1-bit size, the value of thereof set to '0' (or '1') may correspond/be mapped to "off" (and/or "disabled"). In this case, the bit indicating whether to report the location information may indicate that the UE will not report the calculated/acquired location information to the BS/server/LMF. Such a mapping/correspondence relationship according to various embodiments may be summarized as shown in Table 5 below.

TABLE 5

| Bit field mapped to index | Report location information |
|---|---|
| 0 | Disabled |
| 1 | Enabled | and/or

| Bit field mapped to index | Report location information |
|---|---|
| 0 | Enabled |
| 1 | Disabled |

Figure 17:
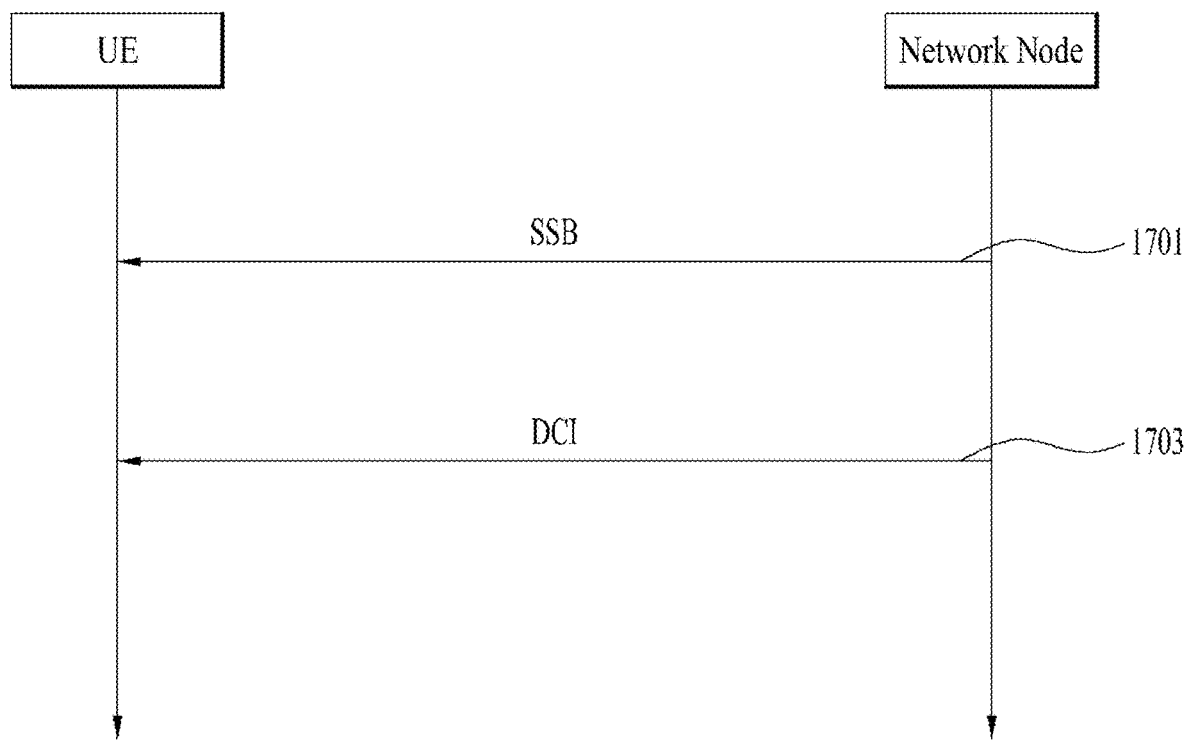
FIG. 17 is a diagram schematically illustrating a method of operating a UE and a network node according to various embodiments.

FIG. 17 is a diagram schematically illustrating a method of operating a UE and a network node according to various embodiments.

Figure 18:
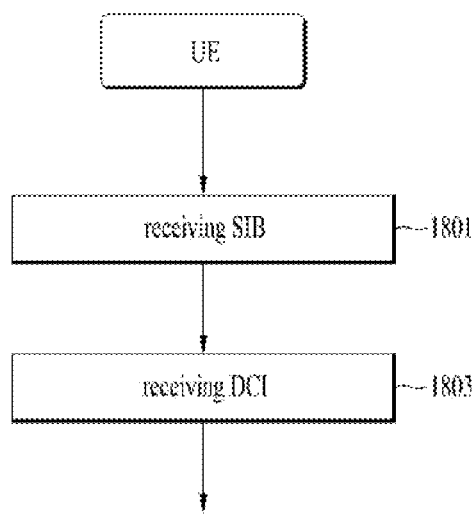
FIG. 18 is a flowchart illustrating a method of operating a UE according to various embodiments.

FIG. 18 is a flowchart illustrating a method of operating a UE according to various embodiments.

Figure 19:
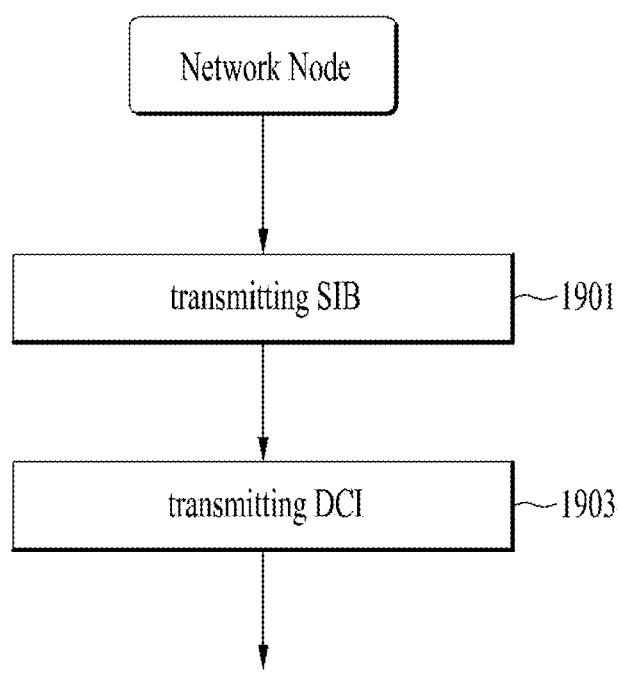
FIG. 19 is a flowchart illustrating a method of operating a network node according to various embodiments.

FIG. 19 is a flowchart illustrating a method of operating a network node according to various embodiments. For example, the network node may be a TP, and/or a BS, and/or a cell, and/or a location server, and/or an LMF, and/or any device that performs the same operation.

Referring to FIGS. 17 to 19, in operations 1701, 1801, and 1901 according to various embodiments, the network node may transmit a system information block (SIB), and the UE may receive the same. According to various embodiments, the SIB may include assistance data related to positioning.

In operations 1703, 1803, and 1903 according to various embodiments, the network node may transmit DCI, and the UE may receive the same. According to various embodiments, the DCI may include information related to a wake-up indication.

According to various embodiments, the DCI may include information indicating whether the UE is configured to acquire/calculate a measurement related to the positioning.

According to various embodiments, when the information indicating whether the UE is configured to acquire/calculate the measurement related to the positioning indicates that the UE is configured to acquire/calculate the measurement related to the positioning, the UE may acquire/calculate the measurement. For example, the UE may acquire/calculate the measurement related to the positioning using a positioning reference signal (PRS) related to the assistance data.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments 4.1. Exemplary Configurations of Devices to which Various Embodiments are Applied FIG. 20 is a diagram illustrating a device that implements various embodiments.

Figure 20:
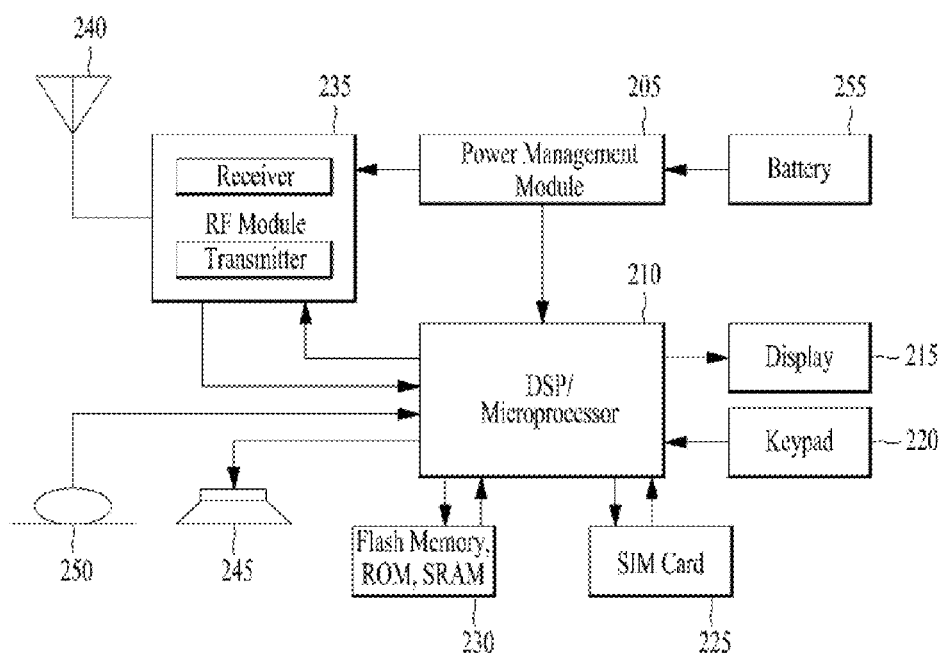
FIG. 20 is a diagram illustrating a device for implementing various embodiments.

The device illustrated in FIG. 20 may be a UE and/or a BS (e.g., eNB or gNB or TP) and/or a location server (or LMF) which is adapted to perform the above-described mechanism, or any device performing the same operation.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. The transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or at least one processor of the communication device included in the UE) may receive a system information block (SIB) including assistance data related to positioning.

According to various embodiments, the at least one processor included in the UE may receive downlink control information (DCI) including information related to a wake-up indication.

According to various embodiments, the DCI may include information indicating whether the UE is configured to acquire a measurement related to positioning.

According to various embodiments, based on that the information indicating whether the UE is configured to acquire a measurement related to positioning indicates that the UE is configured to acquire the measurement related to the positioning, the UE may acquire the measurement using a positioning reference signal (PRS) related to assistance data.

According to various embodiments, at least one processor included in the network node (or at least one processor of the communication device included in the network node) may transmit/broadcast an SIB including assistance data related to positioning.

According to various embodiments, the at least one processor included in the network node may transmit DCI including information related to a wake-up indication to a UE and/or a UE-group including one or more UEs.

According to various embodiments, the DCI may include information indicating whether the UE and/or each of the one or more UEs included in the UE-group is configured to acquire/calculate a measurement related to positioning.

According to various embodiments, when the information indicating whether the UE and/or each of the one or more UEs included in the UE-group is configured to acquire the measurement related to positioning indicates that the UE and/or each of the one or more UEs included in the UE-group is configured to acquire the measurement related to the positioning, a PRS related to assistance data may be transmitted.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied

Various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
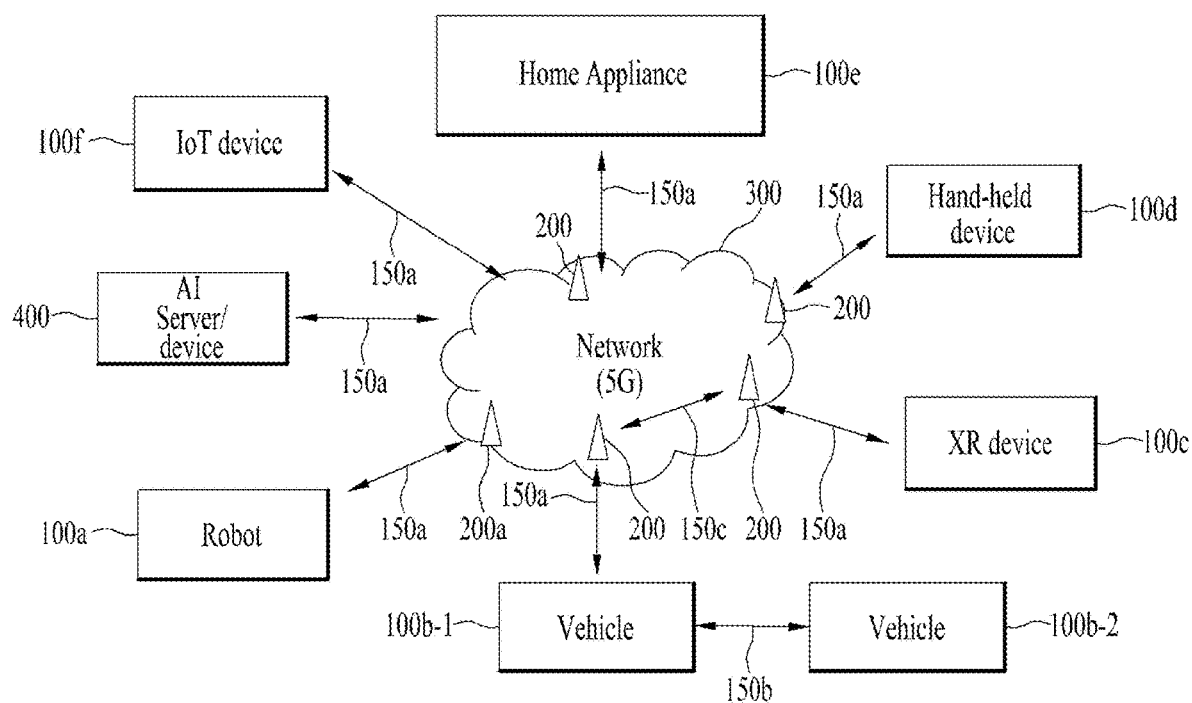
FIG. 21 is a diagram illustrating a communication system applied to various embodiments.

FIG. 21 illustrates an exemplary communication system to which various embodiments are applied.

Referring to FIG. 21, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Devices to which Various Embodiments are Applied

Figure 22:
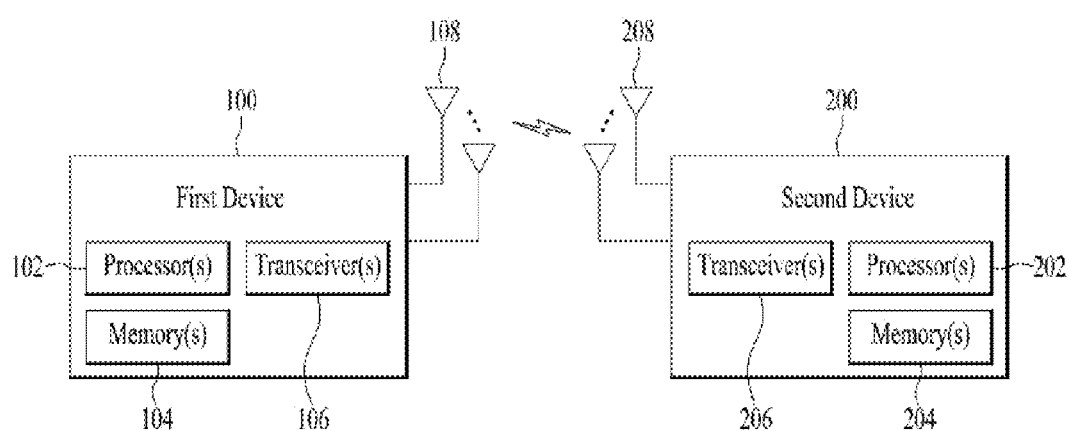
FIG. 22 is a diagram illustrating an example of wireless devices applied to various embodiments.

FIG. 22 illustrates exemplary wireless devices to which various embodiments are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP. RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations of the present disclosure.

According to various embodiments, a computer-readable storage medium may store one or more instructions or computer programs which, when executed by one or more processors, cause the one or more processors to perform operations according to various embodiments or implementations of the present disclosure.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Example of Using Wireless Devices to which Various Embodiments are Applied

Figure 23:
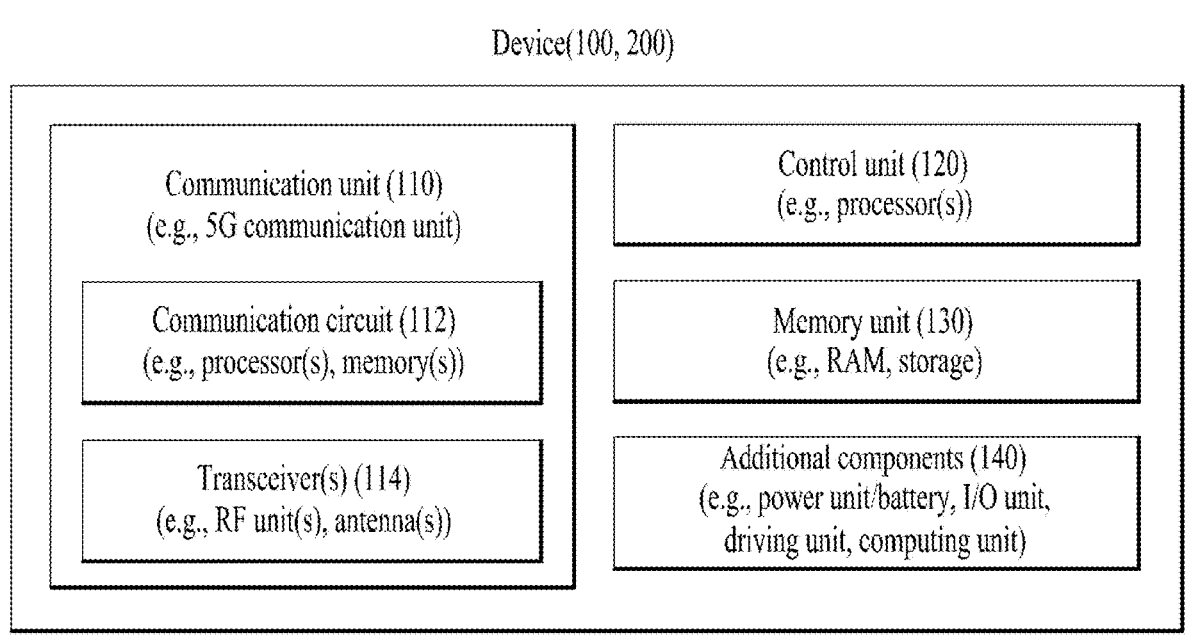
FIG. 23 is a diagram illustrating another example of wireless devices applied to various embodiments.

FIG. 23 illustrates other exemplary wireless devices to which various embodiments are applied. The wireless devices may be implemented in various forms according to a use case/service (see FIG. 21).

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Example of Portable Device to which Various Embodiments are Applied

Figure 24:
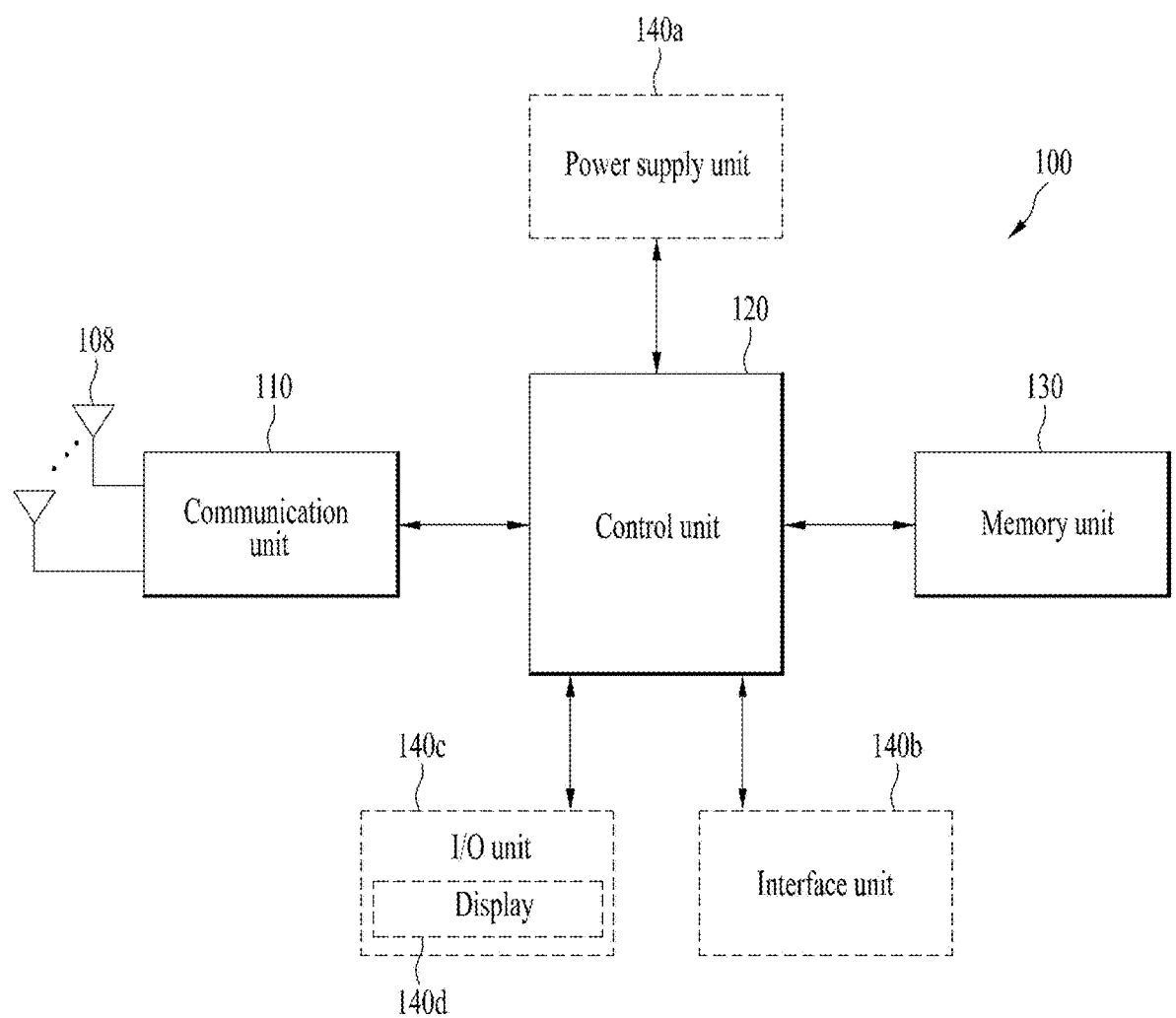
FIG. 24 is a diagram illustrating a portable device applied to various embodiments.

FIG. 24 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments.

Figure 25:
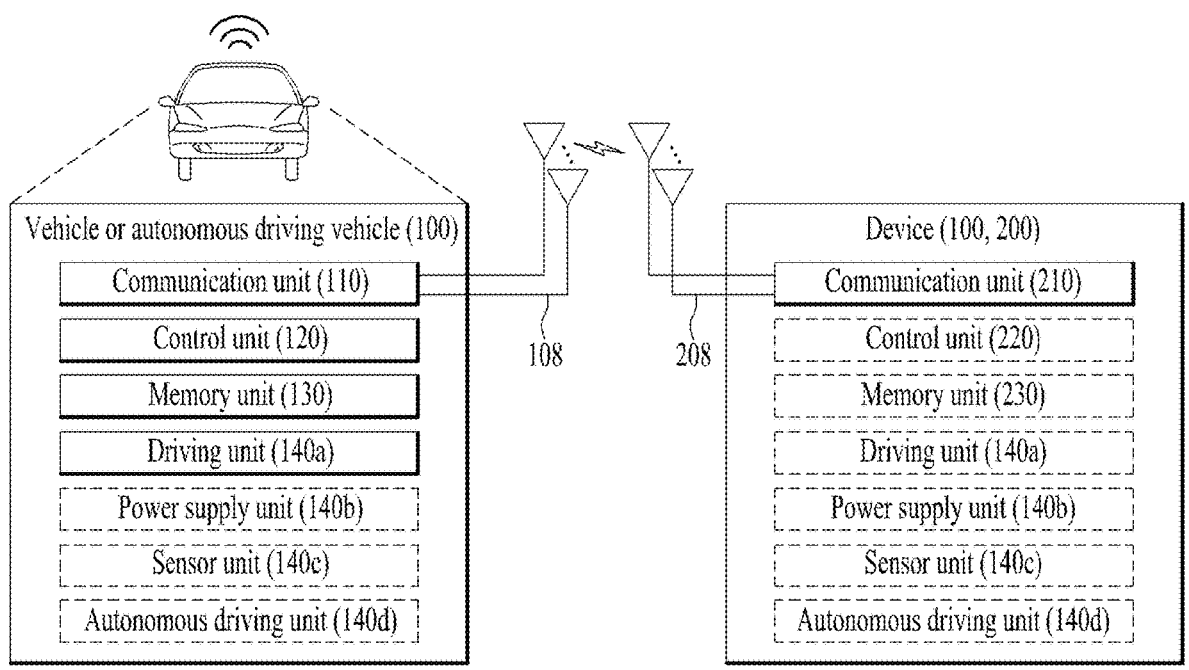
FIG. 25 is a diagram illustrating a vehicle or an autonomous driving vehicle applied to various embodiments.

FIG. 25 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC. 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

What is claimed is:

1. A method by a UE (user equipment) comprising:
receiving a system information block (SIB) including assistance data related to positioning,
wherein the assistance data includes resource configuration information related to a PRS (positioning reference signal);
receiving a downlink control channel including downlink control information (DCI),
wherein
the DCI includes information related to a wake-up indication,
wherein the DCI further includes first information including a first bit field of a 1 bit-size indicating whether the UE is configured to acquire a measurement related to the positioning,
wherein, based on a bit value of the wake-up indication being 1 and a bit value of the first bit field being a first value, the UE monitors the PRS for the measurement and starts an on-duration timer, and
wherein, based on the bit value of the wake-up indication being 0 and the bit value of the first bit field being the first value, the UE performs monitoring for the PRS without starting the on-duration timer.

2. The method of claim 1, wherein,
based on the bit value of the wake-up indication being 1 and the bit value of the first bit field being a second value, the UE performs monitoring for a downlink control channel by starting the on-duration timer without monitoring the PRS.

3. The method of claim 1, wherein, based on the first information including the first bit field having the first value, the DCI further includes second information indicating whether the UE is configured to report the measurement,
wherein, based on the second information indicating that the UE is configured to report the measurement, the measurement is reported at a resource for reporting of the measurement.

4. The method of claim 3, wherein, based on the second information indicating that the UE is configured to report the measurement, one or more of an SIB including allocation information about the resource for reporting of the measurement, a paging message, or a message including information related to a random access response (RAR) are received.

5. The method of claim 3, wherein the second information includes a second bit field of a 1 bit-size,
wherein:
the second bit field having a first value is mapped to the UE being configured to report the measurement; and
the second bit field having a second value is mapped to the UE not being configured to report the measurement.

6. The method of claim 1, wherein the PRS is received after a time for reception of the DCI.

7. The method of claim 1, wherein the DCI further includes information indicating, in a bitmap, a positioning method used for the UE to acquire the measurement using the PRS.

8. A UE (user equipment), comprising:
one or more transceivers;
one or more memories; and
one or more processors connected to the one or more transceivers and the one or more memories;
wherein the one or more processors are configured to:
receive a system information block (SIB) including assistance data related to positioning,
wherein the assistance data includes resource configuration information related to a PRS (positioning reference signal);
receive a downlink control channel including downlink control information (DCI),
wherein the DCI includes information related to a wake-up indication,
wherein the DCI further includes first information including a first bit field of a 1 bit-size indicating whether the UE is configured to acquire a measurement related to the positioning,
wherein, based on a bit value of the wake-up indication being 1 and a bit value of the first bit field being a first value, the one or more processors monitor the PRS for the measurement and start an on-duration timer, and
wherein, based on the bit value of the wake-up indication being 0 and the bit value of the first bit field being the first value, the one or more processors perform monitoring for the PRS without starting the on-duration timer.

9. The UE of claim 8, wherein,
based on the bit value of the wake-up indication being 1 and the bit value of the first bit field being a second value, the one or more processors perform monitoring for a downlink control channel by starting the on-duration timer without monitoring the PRS.

10. The UE of claim 8, wherein, based on the first information including the first bit field having the first value, the DCI further includes second information indicating whether the UE is configured to report the measurement,
wherein, based on the second information indicating that the UE is configured to report the measurement, the measurement is reported at a resource for reporting of the measurement.

11. The UE of claim 8, wherein the UE is configured to communicate with one or more of a mobile terminal, a network, and an autonomous vehicle other than a vehicle containing the UE.

* * * * *